United States Patent
Kong et al.

(10) Patent No.: US 12,088,118 B2
(45) Date of Patent: Sep. 10, 2024

(54) ENERGY-AUTONOMOUS OPTICAL WIRELESS COMMUNICATION SYSTEM

(71) Applicant: KING ABDULLAH UNIVERSITY OF SCIENCE AND TECHNOLOGY, Thuwal (SA)

(72) Inventors: Meiwei Kong, Thuwal (SA); Boon S. Ooi, Thuwal (SA); Tien Khee Ng, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 38 days.

(21) Appl. No.: 17/922,859

(22) PCT Filed: May 11, 2021

(86) PCT No.: PCT/IB2021/054004
§ 371 (c)(1),
(2) Date: Nov. 2, 2022

(87) PCT Pub. No.: WO2021/229434
PCT Pub. Date: Nov. 18, 2021

(65) Prior Publication Data
US 2023/0163638 A1    May 25, 2023

Related U.S. Application Data

(60) Provisional application No. 63/023,454, filed on May 12, 2020.

(51) Int. Cl.
*H02J 50/30*    (2016.01)
*H02J 7/35*    (2006.01)
(Continued)

(52) U.S. Cl.
CPC ............... *H02J 50/30* (2016.02); *H02J 7/35* (2013.01); *H02J 50/001* (2020.01); *H04B 10/112* (2013.01); *H02J 2300/24* (2020.01)

(58) Field of Classification Search
CPC .. H02J 50/30; H02J 50/001; H02J 7/35; H02J 2300/24; H04B 10/112
See application file for complete search history.

(56) References Cited

U.S. PATENT DOCUMENTS

2016/0190863 A1* 6/2016 Ogasawara ............ H04L 65/40
                                                                320/101
2017/0019180 A1    1/2017 Lucrecio et al.
(Continued)

FOREIGN PATENT DOCUMENTS

WO      2018130850 A1      7/2018

OTHER PUBLICATIONS

Chen, X., et al., "Visible Light Communication System Using Silicon Photocell for Energy Gathering and Data Receiving," International Journal of Optics, vol. 2017, Article ID 6207123, Jan. 11, 2017, pp. 1-5.
(Continued)

*Primary Examiner* — Jared Fureman
*Assistant Examiner* — Duc M Pham
(74) *Attorney, Agent, or Firm* — PATENT PORTFOLIO BUILDERS PLLC

(57) ABSTRACT

An optical wireless communication receiver includes one or more harvesting solar cells configured to transform light into electrical power; one or more communication solar cells configured to transform light into an electrical signal embedding information; a rechargeable battery configured to store the electrical power generated by the one or more harvesting solar cells; a communication module configured to decode the electrical signal generated by the one or more commu- (Continued)

nication solar cells and extract the information; a first switch configured to connect the one or more harvesting solar cells to the rechargeable battery for a harvesting-first state, and to the communication module for a communication-second state; a second switch configured to connect the one or more communication solar cells to the communication module for a communication-first state, and to the rechargeable battery for a harvesting-second state; and a microprocessor configured to control the first and second switches.

20 Claims, 22 Drawing Sheets

(51) Int. Cl.
    *H02J 50/00*          (2016.01)
    *H04B 10/112*       (2013.01)

(56) References Cited

U.S. PATENT DOCUMENTS

| | | | |
|---|---|---|---|
| 2020/0076502 A1* | 3/2020 | Leon-Salas | H04B 10/11 |
| 2021/0203419 A1* | 7/2021 | Afgani | H04B 10/506 |
| 2022/0393759 A1* | 12/2022 | Koonen | H04B 10/67 |

OTHER PUBLICATIONS

De Oliveira Filho, J.I., et al., "Toward Self-Powered Internet of Underwater Things Devices," IEEE Communications Magazine, vol. 58, No. 1, Jan. 2020, pp. 68-73.

Fakidis, J., et al., "0.5-Gb/s OFDM-Based Laser Data and Power Transfer using a GaAs Photovoltaic Cell," IEEE Photonics Technology Letters, vol. 30, No. 9, May 1, 2018 (Published Mar. 12, 2018), pp. 841-844, IEEE.

International Search Report in corresponding/related International Application No. PCT/IB2021/054004, date of mailing Jul. 27, 2021.

Kim, S.M., et al., "Simultaneous reception of solar power and visible light communication using a solar cell," Optical Engineering, vol. 53, No. 4, Apr. 7, 2014, pp. 046103 (9 pages).

Kong, M., et al., "Toward Self-Powered and Reliable Visible Light Communication Using Amorphous Silicon Thin-Film Solar Cells," Optics Express, vol. 27, No. 24, Nov. 25, 2019 (published Nov. 11, 2019), pp. 34542-34551.

Kong, M., et al., "Underwater Wireless Optical Communication Using a Lens-Free Solar Panel Receiver," Optics Communications, vol. 426, 2018 (Available online May 18, 2018), pp. 94-98, Elsevier B.V.

Shin, W.H., et al., "Self-Reverse-Biased Solar Panel Optical Receiver for Simultaneous Visible Light Communication and Energy Harvesting," Optics Express, vol. 24, No. 22, Oct. 31, 2016 (Published Sep. 7, 2016) pp. A1300-A1305.

Wang, H.Y., et al., "Using Pre-Distorted PAM-4 Signal and Parallel Resistance Circuit to Enhance the Passive Solar Cell Based Visible Light Communication," Optics Communications, vol. 407, 2018 (Available online Sep. 28, 2017), pp. 245-249, Elsevier B.V.

Written Opinion of the International Searching Authority in corresponding/related International Application No. PCT/IB2021/054004, date of mailing Jul. 27, 2021.

Substantive Examination Report in corresponding/related Saudi Arabian Patent Application No. 522441272, dated Jul. 17, 2023.

\* cited by examiner

Table 1

| | Laboratory testbed | | Outdoor solar cell testbed | Harbor (turbid water) |
|---|---|---|---|---|
| Data rate (Mbit/s) | 1.6 | 1.2 | 1.2 | 1.2 |
| Transmission distance (m) | 20 | 30 | 15 | 2 |
| BER | $1.814 \times 10^{-3}$ | $2.131 \times 10^{-3}$ | $1.624 \times 10^{-4}$ | $6.125 \times 10^{-4}$ |

FIG. 18

ENERGY-AUTONOMOUS OPTICAL WIRELESS COMMUNICATION SYSTEM

CROSS-REFERENCE TO RELATED APPLICATIONS

This application is a U.S. National Stage Application of International Application No. PCT/IB2021/054004, which claims priority to U.S. Provisional Patent Application No. 63/023,454, filed on May 12, 2020, entitled "FULLY ENERGY-AUTONOMOUS OPTICAL WIRELESS COMMUNICATION SYSTEM USING SWITCHABLE HYBRID PHOTORECEIVER," the disclosures of which are incorporated herein by reference in their entirety.

BACKGROUND

Technical Field

Embodiments of the subject matter disclosed herein generally relate to a system and method for exchanging data using optical waves, and more particularly, to an optical wireless communication system that is energy-autonomous.

Discussion Of The Background

The fifth-generation (5G) networks and beyond, as important communication infrastructures, are facing unprecedented opportunities and challenges. Multiple objectives have been defined for 5G networks, such as targeting data rates as high as 10 Gbit/s, reducing power consumption by nearly 90%, improving network availability and reliability, and supporting connectivity among millions of Internet-of-Things (IoT) devices.

To fulfill the data traffic requirement, millimeter-wave massive multiple-input multiple-output (MIMO) systems have emerged as attractive enablers. However, a key challenge is the high-power consumption imposed by intensively deployed base stations, which may not only prevent the implementation of millimeter-wave MIMO systems, but also aggravate the energy crisis and global environmental degradation. Moreover, millimeter-wave communications utilizing the spectrum from 30 GHz to 300 GHz may engender strong electromagnetic radiation within short ranges and pose unknown health risks to humans.

Under these circumstances, optical wireless communication (OWC) technology is supposed to greatly reduce the heavy burden of RF spectrum by using the rich spectrum resources of ~30 PHz. Moreover, with the advantages of high-bandwidth, low-latency, low-cost, small size, low-power consumption, and strong ability of anti-electromagnetic interference, the OWC technology has shown a promising application prospect in the 5G networks and beyond. For example, combing with some innovative technologies (e.g., big data, cloud computing, and artificial intelligence), OWC can be widely used in wearable devices, smart home, and intelligent transportation systems.

In recent years, solar cells with the dual functions of energy harvesting and data acquisition have been proved to be appealing alternatives to commonly used detectors (e.g., PIN diodes and avalanche photodiodes) to alleviate energy issues. Moreover, as photovoltaic solar cells are penetrating into every corner of our lives, they have great potential to support massive data traffic and connectivity of large-scale IoT devices in the future. However, using the same type of solar cells for energy harvesting and data communication has been shown to be inefficient for at least one of these functionalities.

Thus, the existing 5G systems are limited by their energy consumption and the amount of data that can be transmitted. The efficient transmission and sharing of power featuring millions of distributed new-energy devices was realized by the Energy Internet in Industry 3.0, owing to developments in information, power electronics, and intelligent management. The remarkable progress of the Energy Internet has laid a solid foundation for the Energy Internet of Things in Industry 4.0, and will undoubtedly benefit innovations in the upcoming Industry 5.0 standard. With advancements in the industrial revolution, renewable solar energy has been developed to address the global energy crisis and environmental degradation while satisfying people's energy-related demands in daily life. It is well known that photovoltaic (PV) solar cells are the core components for converting solar energy into electricity by using the PV effect. Over the past few years, the development of PV solar cells has rapidly evolved from first-generation silicon (Si) wafer-based solar cells and second-generation thin film-based solar cells to third-generation solar cells based on newly developed light-absorbing materials. The first-generation Si wafer-based solar cells, which feature high-stability, high-efficiency, and low-cost, have been widely deployed in the global solar energy infrastructure. The market penetration of the second-generation thin film-based solar cells has also grown significantly owing to their unique advantages, such as high transparency, flexibility, and light absorption coefficient. With advancements in materials, third-generation solar cells based on new materials (e.g., dye-sensitized, organic, and perovskite-based solar cells) have emerged, and have led to breakthroughs in terms of the photoelectric conversion efficiency (PCE). However, substantial work is still needed to overcome impediments to the implementation of third-generation solar cells in terms of stability, material growth, and cost of fabrication while accelerating their commercialization in the market.

Solar cells have shown significant promise for use in fifth-generation OWC networks and beyond for simultaneous energy harvesting and signal detection [1-8]. By converting optical signals into electrical signals by relying on the photoconductive effect without any external power, solar cells can save more energy while being more environmentally friendly than conventional PIN diodes, avalanche photodiodes, and photomultiplier tubes. Moreover, with the addition of external communication circuits, solar cells that are widely used in the solar energy infrastructure and various emerging solar-powered devices (e.g., wearable devices, autonomous vehicles, and unmanned aerial vehicles) can perform the dual functions of energy harvesting and signal detection, which can facilitate the rapid construction of a self-powered Internet of Things (IoT) in the future. In particular, solar cells that can serve as detectors for simultaneous signal detection and efficient energy harvesting have important application prospects in marine equipment owing to the power shortage in marine environments.

Therefore, there is a need in general for developing an efficient self-autonomous optical wireless communication system, and in particularly, a system that can also work under water.

BRIEF SUMMARY OF THE INVENTION

According to an embodiment, there is an optical wireless communication receiver that includes one or more harvesting solar cells configured to transform light into electrical power; one or more communication solar cells configured to transform light into an electrical signal embedding information; a rechargeable battery configured to store the electrical power generated by the one or more harvesting solar cells; a communication module configured to decode the electrical signal generated by the one or more communication solar cells and extract the information; a first switch configured to connect the one or more harvesting solar cells to the rechargeable battery for a harvesting-first state, and to the communication module for a communication-second state; a second switch configured to connect the one or more communication solar cells to the communication module for a communication-first state, and to the rechargeable battery for a harvesting-second state; and a microprocessor configured to control the first and second switches.

According to another embodiment, there a method for harvesting energy and communicating data, and the method includes receiving light at one or more harvesting solar cells and transforming the light into electrical power; storing the electrical power at a rechargeable battery; receiving the light at one or more communication solar cells and transforming the light into an electrical signal embedded with information; and decoding at a communication module the electrical signal generated by the one or more communication solar cells and extracting the information. The one or more harvesting solar cells, the rechargeable battery, the one or more communication solar cells, and the communication module are part of a single optical wireless communication receiver, and the steps of storing and decoding are taking place at a same time.

According to still another embodiment, there is an optical communication and energy harvesting system that includes a transmitter configured to generate a light beam that encodes data; and an optical wireless communication receiver configured to simultaneously use the light beam for generating electrical power and to extract the encoded data. The optical wireless communication receiver includes one or more harvesting solar cells configured to transform the light beam into the electrical power, and one or more communication solar cells configured to transform the light beam into an electrical signal embedded with the data.

BRIEF DESCRIPTION OF THE DRAWINGS

For a more complete understanding of the present invention, reference is now made to the following descriptions taken in conjunction with the accompanying drawings, in which:

FIGS. 1B, 10, 1D, 1E, and 1F show schematic diagrams of an energy-optical wireless communication receiver with different switching schemes.

FIG. 18 illustrates the results obtained in a laboratory testbed and in various field tests for the energy-autonomous optical wireless communication receiver.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an energy-autonomous OWC system that uses two different types of solar cells for achieving energy harvesting and signal communication. However, the embodiments to be discussed next are not limited to only two type of solar cells or only to a dual functionality that involves energy harvesting and signal communication.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a fully energy-autonomous hybrid-solar-cell receiver is presented in various application scenarios. In this embodiment, the hybrid-solar cell receiver simultaneously uses a monocrystalline Si solar panel with high PCE for efficient energy harvesting, and a thin-film amorphous Si (a-Si) solar panel with a high light absorption coefficient for low-intensity optical signal detection. A large PCE is considered herein to be larger than 10%, or even larger than 20%. A high light absorption coefficient for a solar cell is considered herein to be between $10^6$ to $10^2$ per cm, depending on the wavelength of the incident light. Compared with the use of only one type of solar cell for simultaneous energy harvesting and signal detection as the existing systems [1-7] are doing, the proposed novel hybrid-solar cell receiver can take full advantage of different types of solar cells to improve the energy harvesting as well as the communication performance of the system, independent of each other.

Figure 1A:
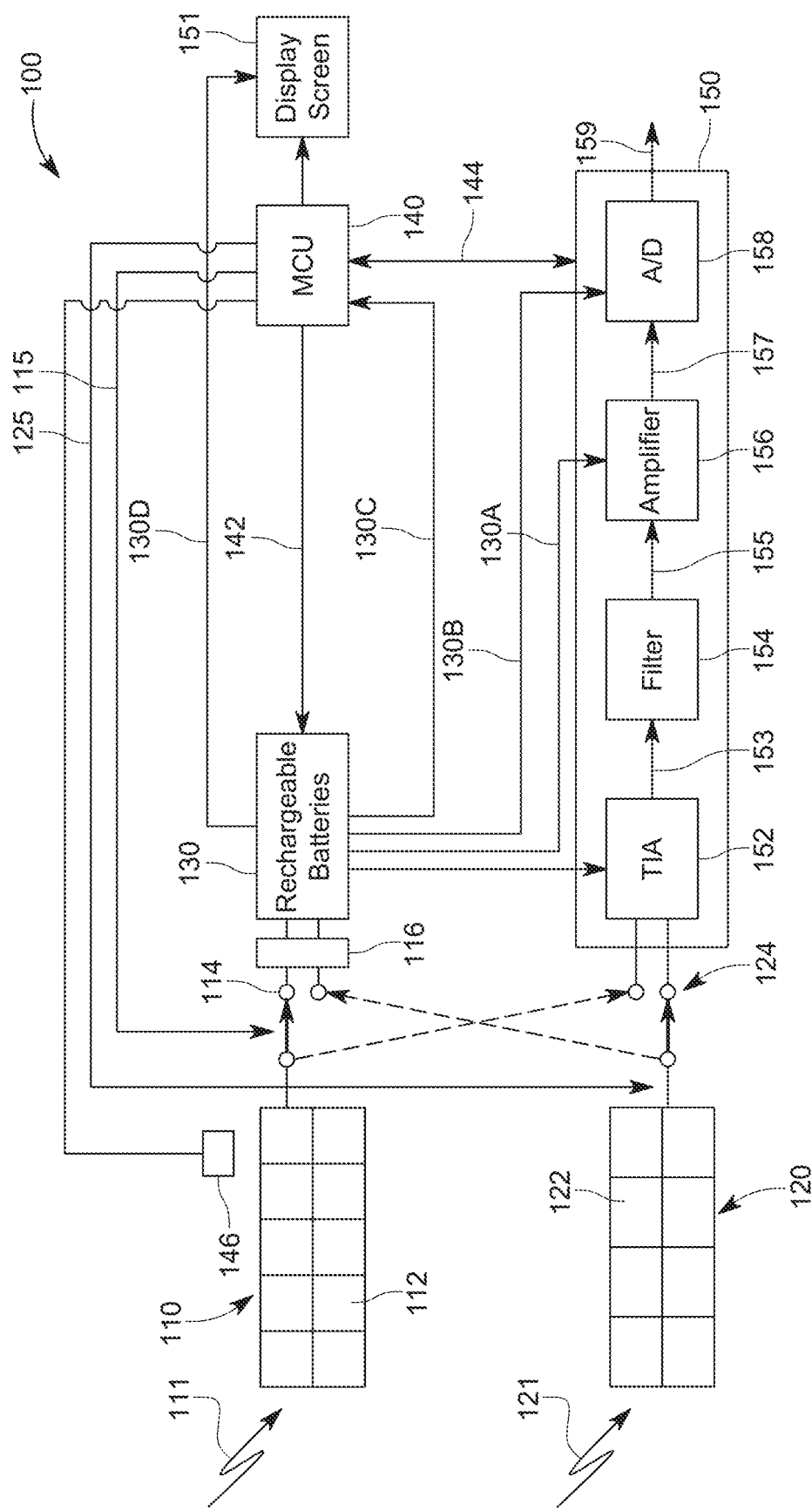
FIG. 1A is a schematic diagram of an energy-autonomous optical wireless communication receiver with hybrid solar cells.

More specifically, FIG. 1A illustrates an embodiment in which a hybrid-solar cell receiver 100 includes at least two types of solar cells, a first solar module 110, which includes one or more harvesting solar cells 112 with a high PCE, and a second solar module 120, which includes one or more communication solar cells 122 with a high light absorption coefficient. In one application, the plural harvesting solar cells are made of a different material from the plural communication solar cells. In this or another application, the plural harvesting solar cells are most sensitive to a first wavelength and the plural communication solar cells are most sensitive to a second wavelength, which is different from the first wavelength. For example, the first wavelength may be in the visible wavelength range, while the second wavelength may be in the ultraviolet wavelength range.

The first solar module 110 is electrically connected, through a first switch 114, to a rechargeable battery 130. The first switch 114 may be an electronic switch, e.g., implemented with solid electronics like an integrated circuit or a transistor, that is electronically controlled by a microcontroller unit (MCU) 140. The first switch 114 may be configured to have only two states, (1) a harvesting-first state in which the first solar module 110 is electrically and directly connected to the rechargeable battery 130 (or to electronics 116 associated with the battery 130) with the purpose of transforming the incoming light into electrical energy and storing that energy, and (2) a communication-second state in which the first solar module is electrically and directly connected to an amplifier 152, which is part of a communication module 150, with the purpose of feeding the light encoded with data to the communication module for data extraction. The amplifier 152 may be a trans-impedance amplifier (TIA) in one application.

The second switch 124 may also be configured to have only two states, (1) a communication-first state in which the second solar module 120 is electrically and directly connected to the communication module 150 and the purpose of this state is to transform the incoming light into an electrical signal that preserves the encoded data and to provide the electrical signal to the communication module for data extraction, and (2) a harvesting-second state in which the second solar module 120 is electrically and directly connected to the battery 130 for transforming the incoming light into electrical power and storing that power into the battery without regard to the encoded data. The battery 130 may be any type of known rechargeable battery. The battery 130 is electrically connected through corresponding electrical links 130A to 130D to all the other electronic components of the receiver 100 for providing electrical power. The second switch 124 may be an electronic switch, e.g., implemented with solid electronics like an integrated circuit or a transistor, which is electronically controlled by the microcontroller unit 140.

The communication module 150 includes, in addition to the amplifier 152, a filter 154, another amplifier 156, and an analog-to-digital converter 158. For this configuration, the TIA 152 is used to convert the photocurrent generated by the harvesting solar cells 112 with a high PCE or the communication solar cells 122 with the high light absorption coefficient into a voltage signal 153. The filter 154 is used to remove the noise from the voltage signal 153 to generate a denoised voltage signal 155 and the amplifier 156 is used to amplify the denoised voltage signal 155, to improve the signal-to-noise ratio of the received optical signals 121, to generate the analog signals 157. The A/D converter 158 digitizes the analog signals 157 to generate digital signals 159, which may be further processed, for example, at the processor 140, for extracting the data encoded into the incoming optical signal 121. The receiver 100 shown in the figure may be part of a router, computer, smart device, sensor, drone, aircraft, underwater operated vehicle, land operated vehicle, etc. for the purpose of providing data communication and energy harvesting.

The MCU 140 is configured to monitor the power of the rechargeable batteries 130 through a link 142 and control an optional display screen 151, to display desired parameters of the receiver 100 in real time, such as the output voltage and current of the harvesting solar cells 112 with high PCE, the consumed voltage and current of the rechargeable batteries 130, and the remaining capacity of the rechargeable batteries 130. The rechargeable batteries 130 are used to store the energy harvested by the harvesting solar cells 112 with high PCE or the communication solar cells 122 with the high light absorption coefficient and they fully power the TIA 152, filter 154, amplifier 156, A/D converter 158, MCU 140, and the display screen 151, if present, so that the receiver is energy-autonomous. This means that in this embodiment, the receiver 100 has no other source of energy except the energy generated by the solar cells and stored in the battery 130.

The harvesting solar cells 112 with high PCE are mainly used for energy harvesting, which is favorable to shorten the charging time of the rechargeable batteries. Thus, the first switch 114 is mainly maintained in the harvesting-first state. However, if the harvesting solar cells 112 with the high PCE have a high bandwidth, they can also be used for high-speed OWC. If this is the case, the MCU 140 instructs the first switch 114 to change its status from the harvesting-first state to the communication-second state discussed above, i.e., to connect the harvesting solar cells 112 directly to the communication module 150.

For example, the MCU 140 is configured to detect that the digital signal 159 (or any other signals used in the communication module 150, see link 144 to the module 150) embeds an instruction or command or data indicative of the fact that the communication message 121 received at the second solar module 120 requires a high speed or high quality data transmission. This may be the case when a movie is transmitted and the data packets require high priority. The opposite situation is when an email is transmitted, which is treated as low priority. Based on this information, and knowing the speed of the data transmission and/or the quality of the data transmission possible through the second solar module 120, the MCU 140 can decide to supplement the speed and/or quality of the transmission by switching the first switch 114 from the harvesting-first state to the communication-second state, so that the signals 111 from the first solar module 110 are also used for communication purposes and not for energy harvesting. For achieving this change, the MCU 140 is electronically connected to the first switch 114 through an electrical connection 115. As will be discussed later, the MCU 140 is similarly connected to the second switch 124, through an electronic connection 125. For this scenario, both the first and second solar modules 110 and 120 feed their received data 111 and 121 to the communication module 150 for exclusive communication processing. At this time, the entire receiver 100 works based on the energy already stored in the battery 130. This act of switching the first switch from the harvesting-first state to the communication-second state is performed automatically, by the MCU 140, based exclusively on the data stored in the received signal 121, and the capabilities of the second solar module 120, without human intervention, or when a measurement of the data speed through the communication module is smaller than a given threshold. In one application, it is possible to use a time factor for producing this change, for example, if the current time at the MCU 140 is between dusk and dawn, the harvesting-first state of the first switch 114 is automatically changed to the communication-second state, no matter of the data embedded into the received signal 121, as there is no solar energy to harvest. This situation changes if another light source is used for harvesting instead of the sun. Other factors may be used for the MCU 140 to determine when to change the state of the first switch.

Similarly to the dual purpose of the harvesting solar cells 112, the communication solar cells 122 with the high light absorption coefficient can not only be used as detectors to implement reliable and energy-efficient OWC through the communication module 150, but they also can be used for energy harvesting under weak light conditions, as they have a higher response to the weak light. This means that the MCU 140 can be connected to a light sensor 146, which is located next or on the first solar module 110, and the light sensor 146 provides information about the light intensity next to the first solar module. When the received light intensity signal has a value below a given threshold, the MCU 140 can be configured to determine that not enough light is arriving at the harvesting solar cells 112, and thus, the MCU 140 activates the second switch 124, through the dedicated electronic connection 125, and changes the communication-first state of the switch, to the harvesting-second state, for which the communication solar cells 122 function as energy harvesting cells, and all the electrical energy transformed from the received light energy is sent to the battery 130. This means that for this situation, all the solar cells 112 and 122 function exclusively for harvesting energy and recharging the battery 130. This also means that no light communication takes place at this stage. The MCU 140 can switch the second switch 124 from the communication-first state to the harvesting-second state, for example, when the MCU determines that a power level of the battery 130 is below a certain threshold, for example, 10%. Other values may be used. This means that as soon as the MCU determines that the battery 130 is low on resources and the light intensity measured by the sensor 146 at the harvesting solar cells 112 is also low, the MCU decides that the communication solar cells 122 need to help the harvesting solar cells 112 to recharge the battery 130. It is noted that as the receiver 100 is energy-autonomous, having the battery 130 functional and charged is one of the important goals of the MCU. Thus, the harvesting solar cells 112 with high PCE and the communication solar cells 122 with a high light absorption coefficient constitute a switchable photoreceiver, which is switchable according to one of possible application scenarios, as discussed now.

Figure 1B:
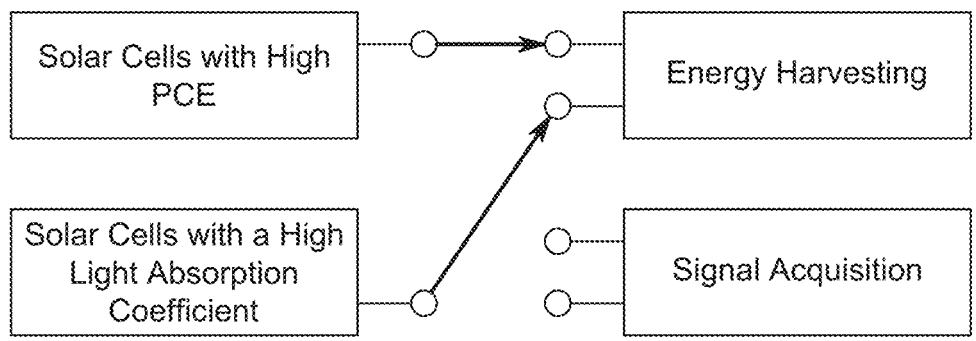
Figure 1C:
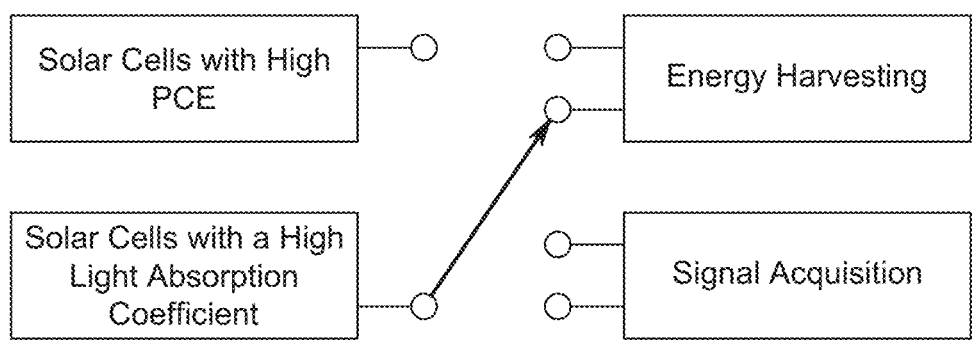

As shown in FIG. 1B, when communication is not required, the sunlight is more than a few $\mu W/cm^2$, and the light from the communication light source is much more than a few $\mu W/cm^2$, both the harvesting solar cells with high PCE and the communication solar cells with a high light absorption coefficient are used for energy harvesting from sunlight and light sources. Note that the system discussed herein can use one light source (e.g., sun) for energy harvesting purposes and another light source (e.g., a laser) for communication purposes. Thus, the incoming light beam 111 in FIG. 1A could be solar light while the incoming light beam 121 in the same figure could be a laser beam. In one application, the two light beams 111 and 121 are generated by a same source, for example, a laser device. The laser device is just an example. Those skilled in the art would understand that the laser device may be replaced by any light emitting device. Further, the wavelength range of the two incoming beams 111 and 121 may be different, for example, visible light for beam 111 and UV or IR light for beam 121. In one application, both beams of light 111 and 121 are received by each of the solar cells 110 and 120, but the solar cells may be configured to process only one or both of the beams.

As shown in FIG. 1O, when communication is not required, the sunlight is weak (about a few $\mu W/cm^2$), and the light from the communication light sources is weak (about a few $\mu W/cm^2$), the communication solar cells with a high light absorption coefficient are used for energy harvesting from sunlight and the communication light sources.

As shown in FIG. 1B, when communication is not required, the sunlight is much more than about a few $\mu W/cm^2$, and the light from light sources is weak (about a few $\mu W/cm^2$), the harvesting solar cells are used for energy harvesting from sunlight and the communication solar cells with a high light absorption coefficient are used for energy harvesting from sunlight and light sources.

As shown in FIG. 1B, when communication is not required, the sunlight is weak (about a few $\mu W/cm^2$), and the light from the light sources is much more than a few $\mu W/cm^2$, the harvesting solar cells with high PCE are used for energy harvesting from the communication light sources and the communication solar cells with a high light absorption coefficient are used for energy harvesting from both the sunlight and the communication light sources.

Figure 1D:
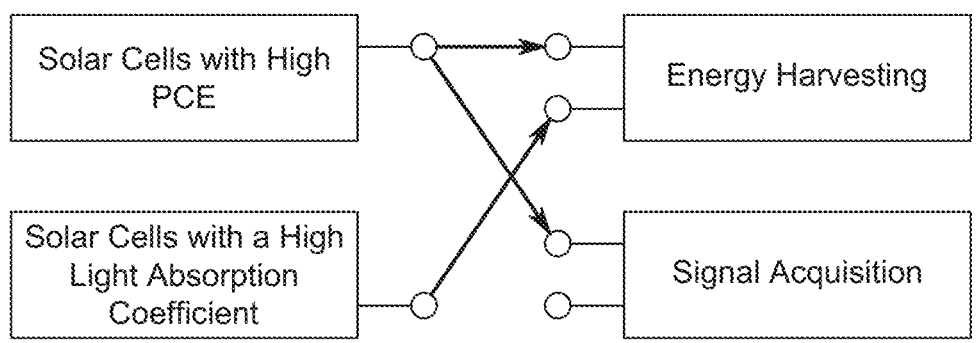

As shown in FIG. 1D, when the energy used for communication is sufficient (i.e., the stored energy exceeds the power requirement of the communication circuits), and communication is required, the sunlight is much more than a few $\mu W/cm^2$, and the light from the communication light sources is much more than a few $\mu W/cm^2$, the communication solar cells with a high light absorption coefficient are used for energy harvesting from sunlight and the communication light sources and the harvesting solar cells with high PCE are used for simultaneous signal detection and energy harvesting from sunlight and light sources.

Figure 1E:
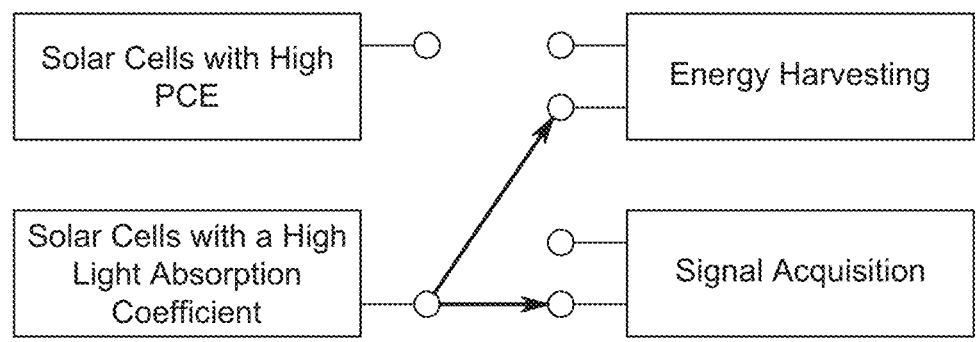

As shown in FIG. 1E, when the energy used for communication is sufficient, communication is required, the sunlight is weak (about a few $\mu W/cm^2$), and the light from communication light sources is weak (about $\mu W/cm^2$), the communication solar cells with a high light absorption coefficient are used for simultaneous signal detection and energy harvesting from the sunlight and the communication light sources.

Figure 1F:
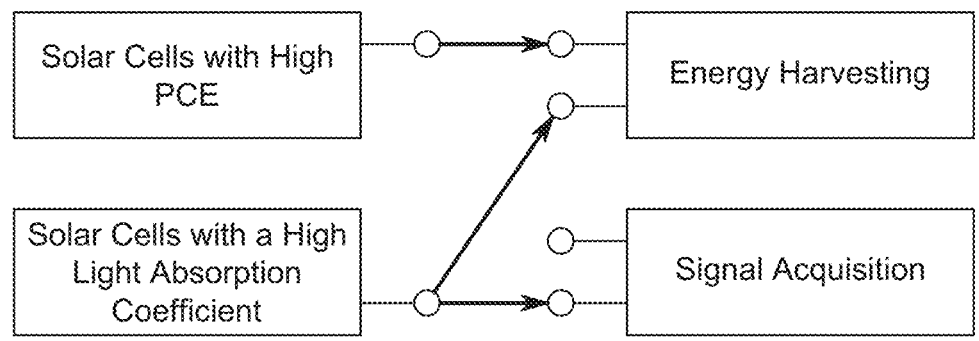

As shown in FIG. 1F, when the energy used for communication is sufficient, the communication is required, the sunlight is much more than a few $\mu W/cm^2$, and the light from light sources is weak (about a few $\mu W/cm^2$), the harvesting solar cells with high PCE are used for energy harvesting from the sunlight and the communication solar cells with a high light absorption coefficient are used for simultaneous signal detection and energy harvesting from the sunlight and the communication light sources.

As shown in FIG. 1D, when the energy used for communication is sufficient, the communication is required, the sunlight is weak (about a few $\mu W/cm^2$), and the light from the communication light sources is much more than a few $\mu W/cm^2$, the communication solar cells with a high light absorption coefficient are used for energy harvesting from the sunlight and the harvesting solar cells with high light PCE are used for simultaneous signal detection and energy harvesting from light sources.

As shown in FIG. 1B, when the energy used for communication is not sufficient (i.e., the stored energy is less than the power requirement of the communication circuits), the communication is required, the sunlight is much more than about a few $\mu W/cm^2$, and the light from communication light sources is much more than a few $\mu W/cm^2$, both the harvesting solar cells with high PCE and the communication solar cells with a high light absorption coefficient are used for energy harvesting from the sunlight and the communication light sources. As shown in FIG. 1D, when the energy used for communication is sufficient, the communication solar cells with a high light absorption coefficient are used for energy harvesting from sunlight and the communication light sources and the harvesting solar cells with high PCE are used for simultaneous signal detection and energy harvesting from the sunlight and the communication light sources.

As shown in FIG. 1O, when the energy used for communication is not sufficient, the communication is required, the sunlight is weak (about a few $\mu W/cm^2$), and the light from the communication light sources is weak (about a few $\mu W/cm^2$), the communication solar cells with a high light absorption coefficient are used for energy harvesting from the sunlight and the communication light sources. As shown in FIG. 1 E, when the energy used for communication is sufficient, the communication solar cells with a high light absorption coefficient are used for simultaneous signal detection and energy harvesting from the sunlight and the communication light sources.

As shown in FIG. 1B, when the energy used for communication is not sufficient, the communication is required, the sunlight is much more than a few $\mu W/cm^2$, and the light from light sources is weak (about a few $\mu W/cm^2$), the harvesting solar cells with high PCE are used for energy harvesting from the sunlight and the communication solar cells with a high light absorption coefficient are used for energy harvesting from the sunlight and the communication light sources. As shown in FIG. 1F, when the energy used for communication is sufficient, the harvesting solar cells with high PCE are used for energy harvesting from the sunlight and the communication solar cells with a high light absorption coefficient are used for simultaneous signal detection and energy harvesting from the sunlight and the communication light sources.

As shown in FIG. 1B, when the energy used for communication is not sufficient, the communication is required, the sunlight is weak (about a few $\mu W/cm^2$), and the light from the communication light sources is strong, i.e., much more than a few $\mu W/cm^2$, the harvesting solar cells with high PCE are used for energy harvesting from the communication light sources and the communication solar cells with a high light absorption coefficient are used for energy harvesting from the sunlight and the communication light sources. As shown in FIG. 1D, when the energy used for communication is sufficient, the communication solar cells with a high light absorption coefficient are used for energy harvesting from the sunlight and the harvesting solar cells with high light PCE are used for simultaneous signal detection and energy harvesting from the communication light sources.

Figure 2A:
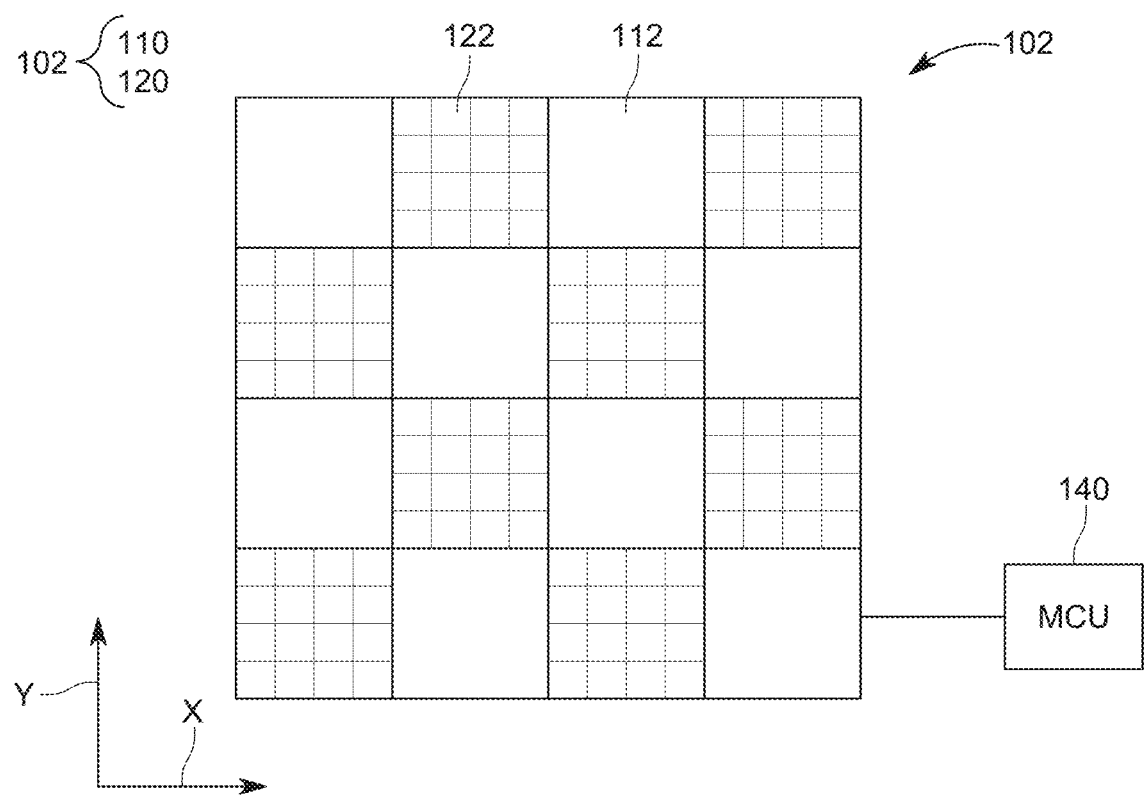
FIGS. 2A and 2B show various geometrical configurations of the hybrid solar cells.

Although FIG. 1A shows the harvesting solar cells 112, which form the first solar module 110, being separately located from the communication solar cells 122, which form the second solar module 120, in one embodiment, it is possible to have the two types of cells combined in a single panel 102, or placed next to each other, as illustrated in FIG. 2A. In the embodiment shown in the figure, the harvesting solar cells 112 are interposed with the communication solar cells 122, along both the X axis and the Y axis. However, in one embodiment, it is possible to interpose the cells 112 and 122 only along a single axis. Although the individual cells 112 and 122 are interposed, their electrical connections are configured that the harvesting solar cells 112 are electrically connected only among themselves and the communication solar cells 122 are electrically connected only among themselves, as schematically illustrated in FIG. 1A. In other words, in this embodiment, no harvesting solar cell is electrically connected to a communication solar cell, i.e., these cells are only in mechanical contact with each other and not in electrical contact. Other patterns may be used to distribute the cells 112 and 122 in the single solar panel 102. In one application, the distribution of the cells 112 and 122 is uneven, for example, randomly.

The patterned distribution of the cells 112 and 122 has the following advantage. If OWC is implemented for the communication solar cells 122, it is required that the optical beam is aligned with the optical receiver, so that the optical signal is received by the solar cell. This alignment requirement is a serious problem for the existing devices. However, this alignment problem is much relaxed when plural communication solar cells are used and distributed over a larger area as the incoming optical beam is likely to strike at least one communication solar cell 122 from the plural solar cells 122, when they are distributed over the entire panel 102.

Figure 2B:
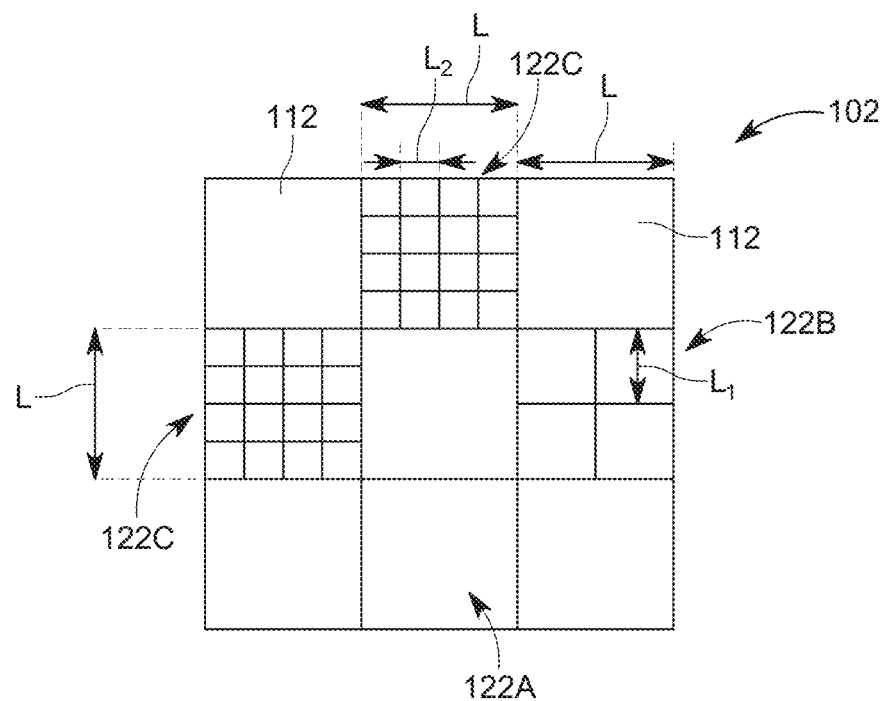

The size of the communication solar cells 122 impact the speed of the optical communication that can be achieved with the communication module 150. For example, if the area of each solar cell 122 is between about 1 cm$^2$ and 100 cm$^2$, then the maximum speed of the data transmission is in the Mbit/s range. However, if the area of each solar cell 122 is smaller than 1 cm$^2$, then speeds of about Gbit/s can be obtained with this configuration. The area of an individual harvesting solar cell 112 is not relevant for harvesting the energy as long as the overall area of the harvesting solar cells is above a given number. In one application, it is possible that each of the harvesting solar cells 112 has a size L, one or more of the communication solar cells 122A have the same size L, one or more of other communication solar cells 122B have a smaller size L1, and still one or more of other communication solar cells 122C have an even smaller size L2, as illustrated in FIG. 2B. In this embodiment, L1 and L2 are factors of L. In one embodiment, only one of the communication solar cells 122A or 122B or 122C may be used for a given module 102. However, in another embodiment, any combination of the cells 122A to 122C or other smaller cells may be used, depending on the desired application to be implemented.

Figure 3:
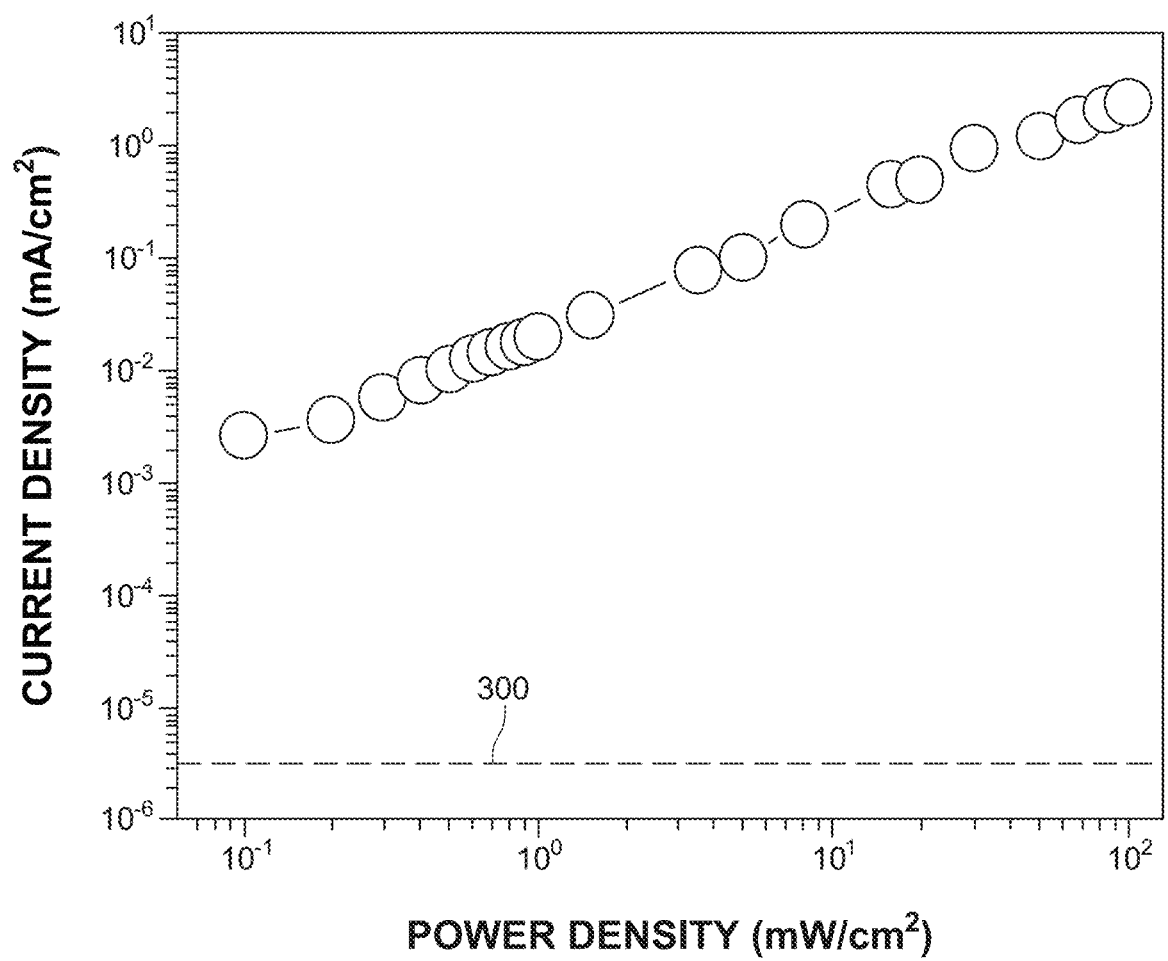
FIG. 3 shows current densities of a a-Si thin-film solar cell under different power densities.

The inventors have used an amorphous silicon (a-Si) thin-film solar cell with a high light absorption coefficient to implement the communication solar cells 122. The current density of the a-Si thin-film solar cell was measured at different power intensities. As shown in FIG. 3, the a-Si thin-film solar cell has a high current density of 2.6 $\mu A/cm^2$ at the lowest possible illumination of $10^{-1}$ mW/cm$^2$. Moreover, the a-Si thin-film solar cell has a sufficiently low dark current density 300 of approximately 3.2 nA/cm$^2$, which leads to a sufficiently large separation between the dark and light currents for low-intensity optical signal detection. Assuming a good linear dynamic response, it is expected that the a-Si thin-film solar cell is capable of low-intensity optical signal detection of 1 $\mu W/cm^2$.

Figure 4:
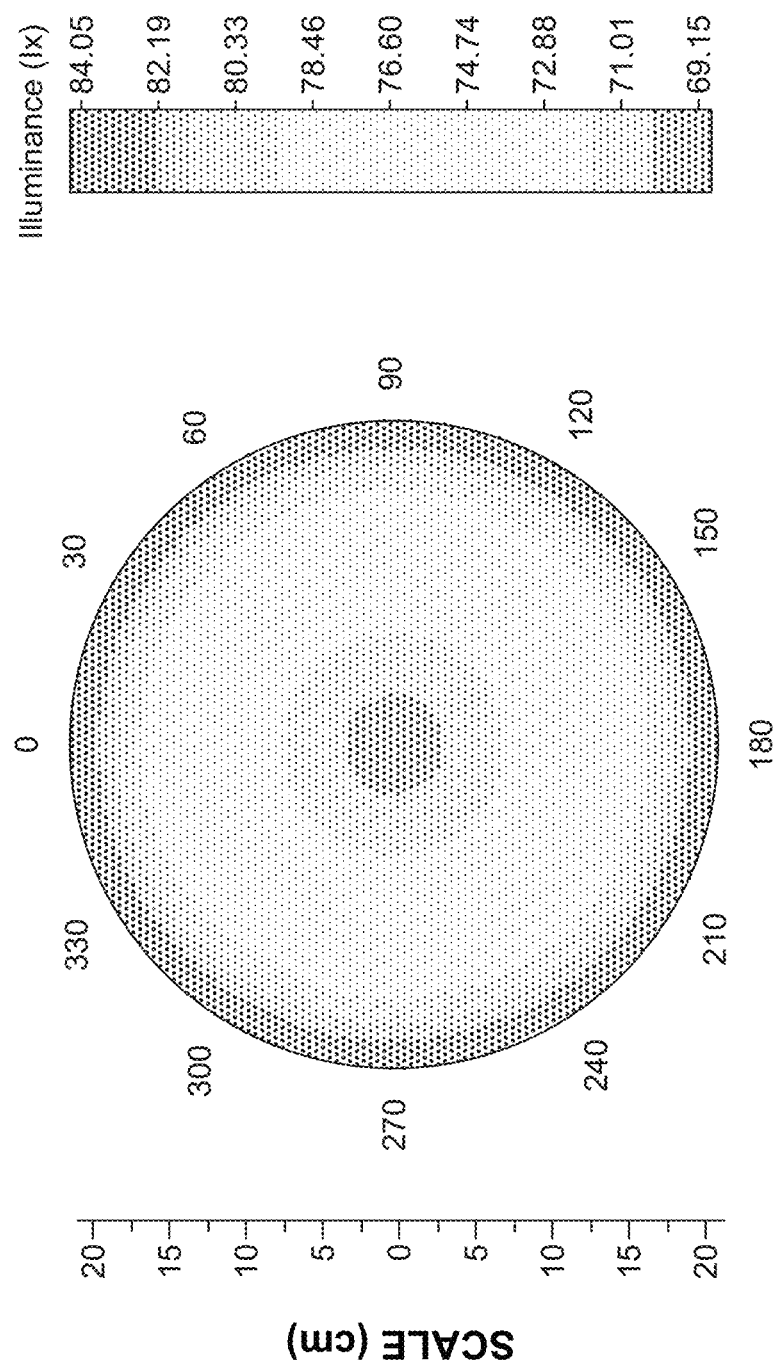
FIG. 4 shows illuminance distributions of a white-light laser at a distance of 20 m.
Figure 5:
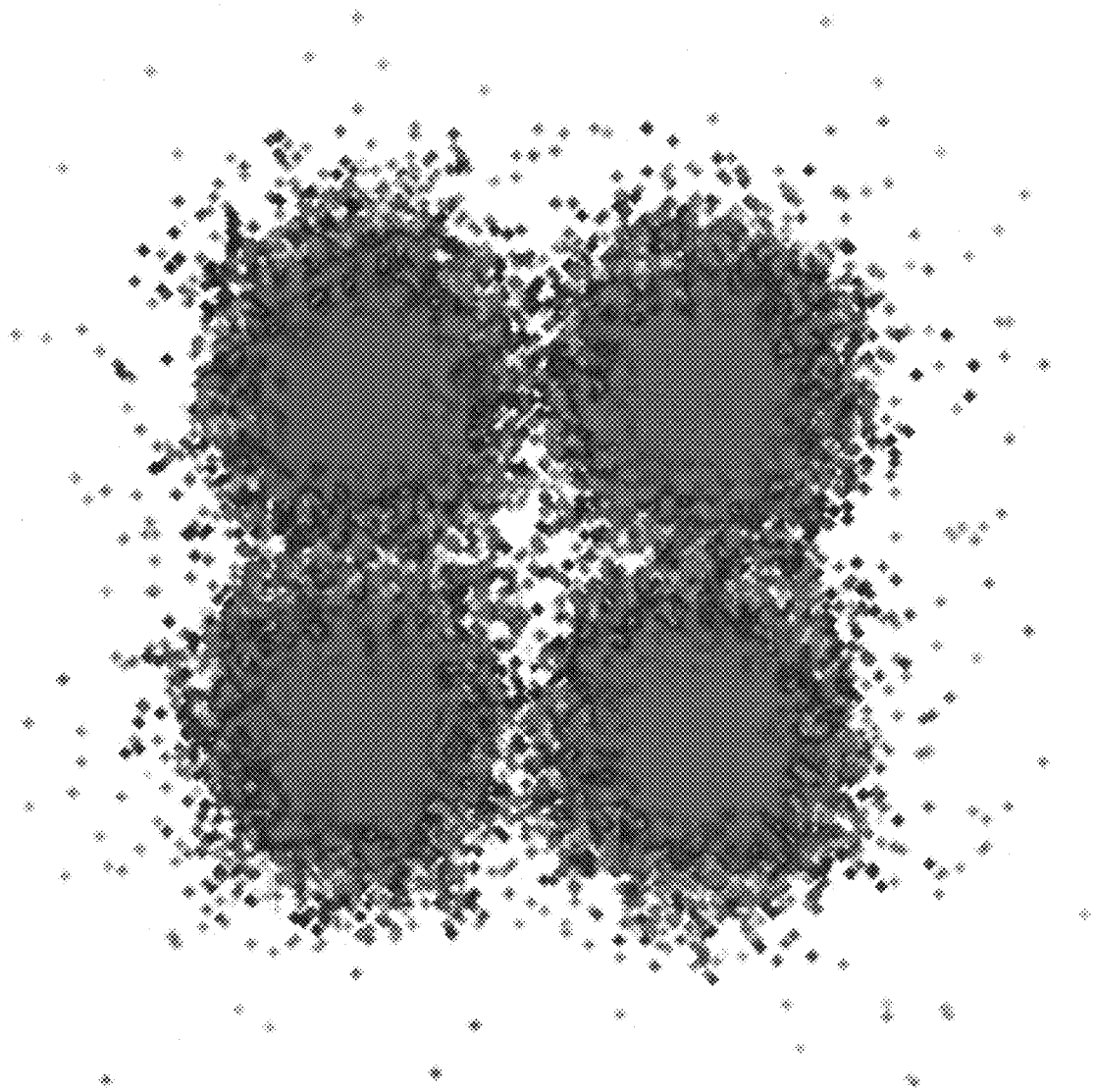
FIG. 5 shows the constellation map of the 1-Mb/s 4-quadrature amplitude modulation (QAM) orthogonal frequency division multiplexing (OFDM) signals at the transmission distance of 20 m.

With these solar cells, a system including a white-light laser as the source of the optical communication beam, and the a-Si thin-film solar cell as the optical receiver for the cells 122 was used to further investigate the performance of the a-Si thin-film solar cell in low-intensity optical signal detection. In the experiment, the illuminance distributions within an area of 1385 cm$^2$ at a distance of 20 m was measured, as shown in FIG. 4. The area of the light spot at the distance of 20 m was much larger than that of the a-Si thin-film solar cell (36 cm$^2$). The average illuminance on the a-Si thin-film solar cell was merely 79.95 lx. Under these circumstances, 1 Mbit/s 4-quadrature amplitude modulation (QAM) orthogonal frequency-division multiplexing (OFDM) signals were achieved with only a 290-kHz system bandwidth. The corresponding constellation map with a bit error rate of $1.642 \times 10^{-3}$ is shown in FIG. 5, which is well converged. These results indicate that the a-Si thin-film solar cell has a good robustness in the low-intensity optical signal detection. Besides, it is inferred that the data rate of 1 Mbit/s could still be achieved in the illumination area with a radius of about 9 cm at the distance of 20 m according to FIG. 4. This means that the white-light laser and the a-Si thin-film solar cell-based system have great potential to alleviate link alignment issues.

Figure 6:
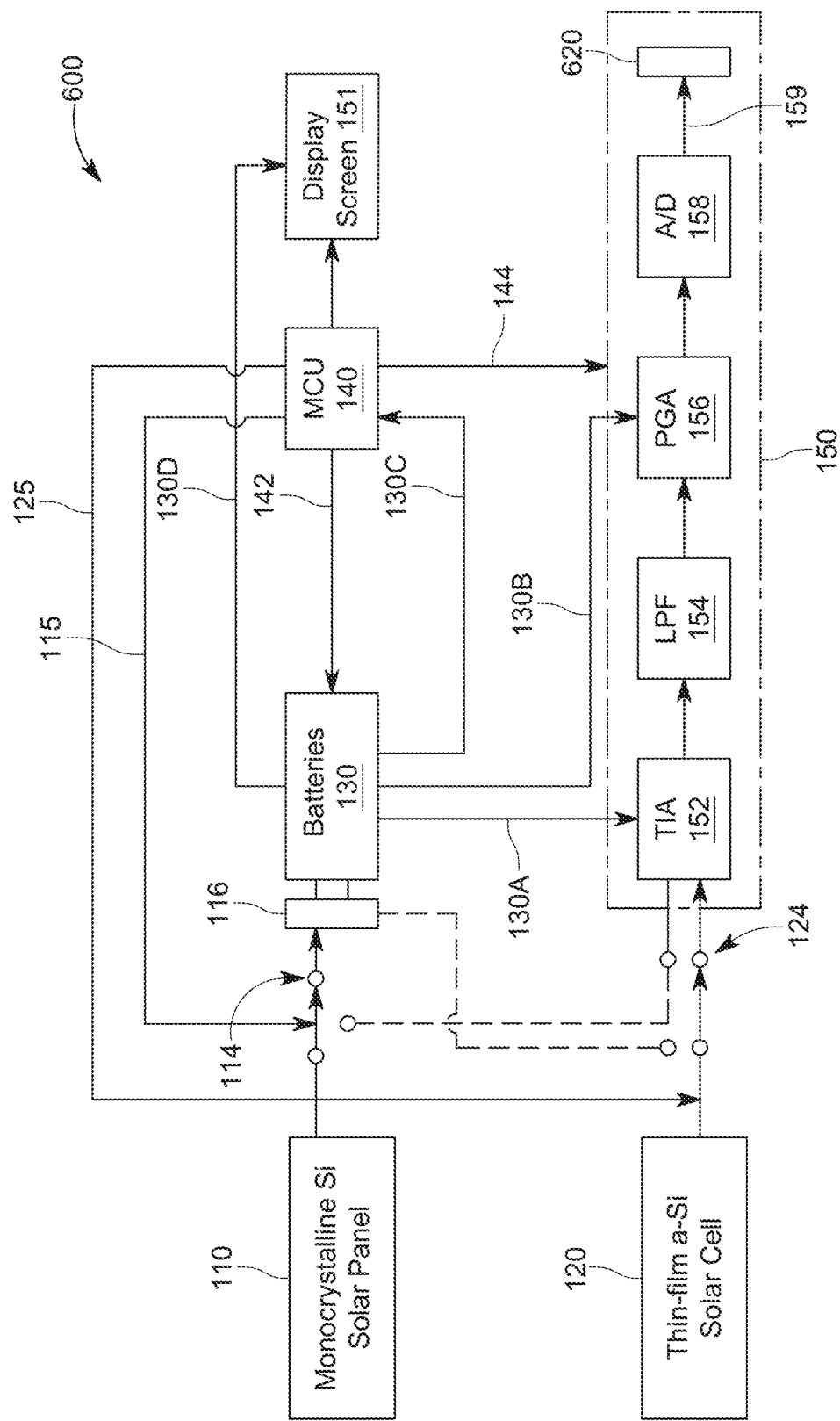
FIG. 6 is a schematic diagram of another energy-autonomous optical wireless communication receiver with hybrid solar cells.
Figure 7:
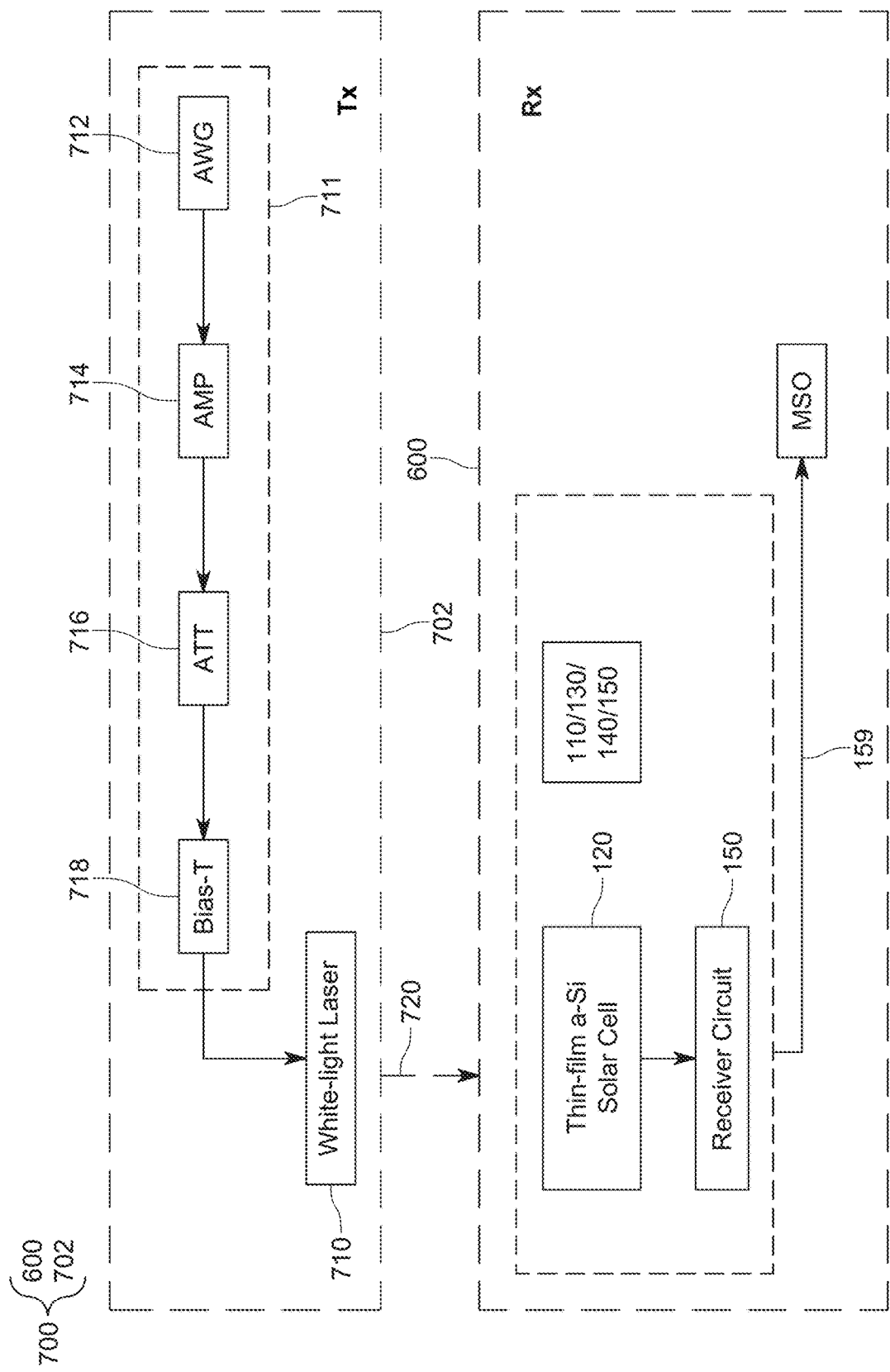
FIG. 7 is a schematic diagram of an optical wireless communication system that uses an energy-autonomous optical wireless communication receiver with hybrid solar cells.

In another embodiment, the receiver 100 shown in FIG. 1A has been modified to implement the amplifier 156 as a programmable-gain amplifier (PGA), and also to add a demodulating unit 620, for demodulating the digitized signal 159 and extracting the embedded information, as shown by receiver 600 in FIG. 6. Compared with using an amplifier with a fixed gain, the proposed scheme can automatically adjust the gain according to the residual electricity to optimize communication performance. To test communication performance, the inventors conducted an experiment on a laboratory testbed for a system 700 that includes the receiver 600 and a transmitter 702, as shown in FIG. 7. Using the modified receiver 600 and a white-light laser 710 for the transmitter 702 (note that the laser 710 is supported by electronics 711 for encoding data into an optical beam 720), the inventors achieved transmission at distances of 20 m and 30 m for illumination and visible light communication (VLC) at data rates of 1.6 Mbit/s and 1.2 Mbit/s, respectively. The electronics 711 may include an arbitrary waveform generator (AWG) 712, which is configured to send four-quadrature amplitude modulation (4-QAM) OFDM signals. The signals are then superposed onto the white-light laser 710 by a bias-tee (Bias-T) 718 after being transmitted through an amplifier (AMP) 714 and an attenuator (ATT) 716. The white-light laser 710 with a bias current of 670 mA was used for simultaneous illumination and communication in this embodiment.

To study the performance of the system 700 in terms of simultaneous energy harvesting and VLC, a field trial was conducted on a PV solar cell testbed. Energy autonomy was implemented using the solar cell module 110 under direct sunlight. OFDM signals at a data rate of 1.2 Mbit/s were obtained over a 15-m air channel 720. This indicates that the system 600 delivers good performance in terms of energy harvesting, low-intensity optical signal detection, and resistance to background noise. The inventors also investigated the communication performance of the system 600 in a more challenging environment: namely, in the turbid water of the Red Sea, i.e., underwater, where a 2-m transmission distance was successfully implemented without accurate link alignment at a data rate of 1.2 Mbit/s. This means that the receivers 100 or 600 can be used for underwater mobile sensor networks. For this experiment, the solar module 120 has a length of 6 cm and a width of 6 cm. It could detect light as week as 1 $\mu W/cm^2$, which is favorable for the implementation of long-distance VLC.

To achieve energy balance, the monocrystalline Si solar panel 110 was used for energy harvesting and was implemented as two off-the-shelf monocrystalline Si solar cells connected in series to provide a total active area of 156 cm$^2$ (length: 13 cm and width: 12 cm). The energy harvested by the monocrystalline Si solar panel 110 was stored in two batteries. When the thin-film a-Si solar module 120 was used for communication, the generated photocurrent was first converted into voltage by using the TIA 152 and then sent to a low-pass filter (LPF) 154 to remove noise, which improved the signal-to-noise ratio (SNR) of the received signals. Note that the microcontroller unit 140 was used to monitor the power of the batteries in real time. The voltage gain of a PGA 156 automatically changes according to the battery power, which can save energy and help enhance communication performance by increasing the amplitudes of the signals. Finally, the output signals 159 were captured by a mixed signal oscilloscope (MSO) and demodulated offline. A display screen 151 was used to show some of the parameters of the system 600 in real time. As all the components had consumed a small amount of power, the total consumed electrical power of the system 600 was only around 500 mW.

Figure 8:
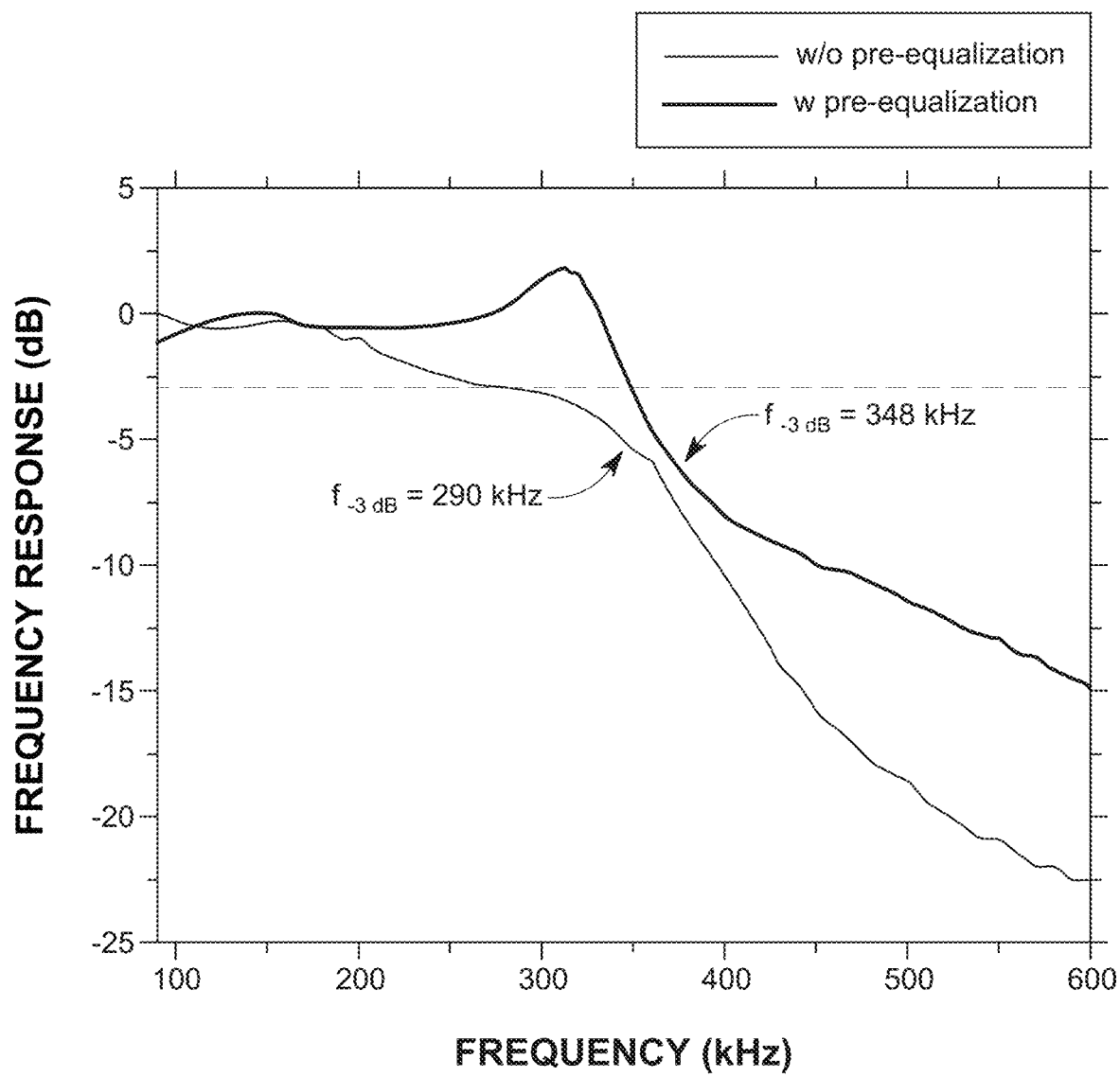
FIG. 8 shows the frequency response of the energy-autonomous optical wireless communication receiver measured over a 20 m air channel before and after using hardware equalization.
Figure 9:
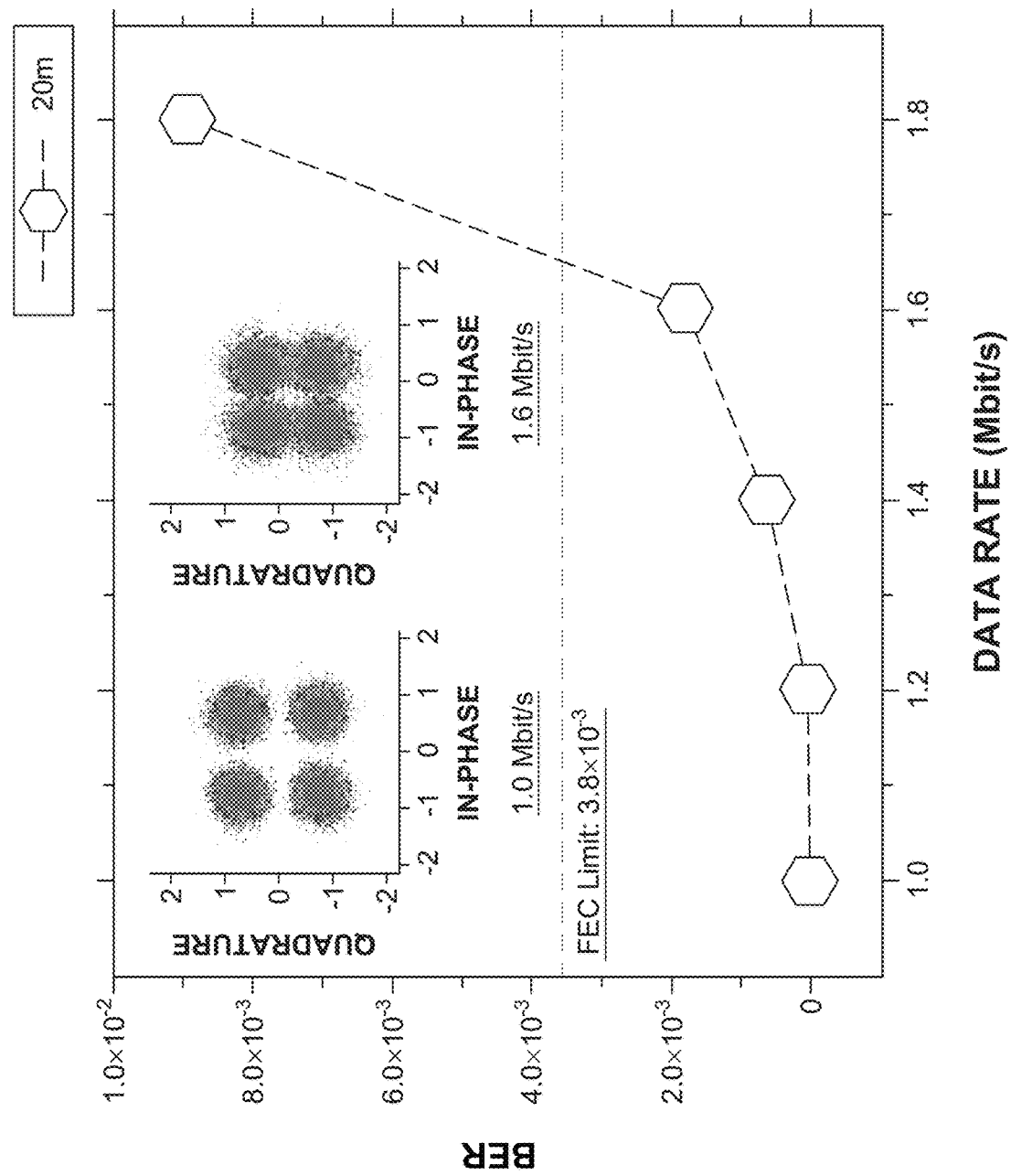
FIG. 9 shows the bit error ratio versus data rate over the 20 m air channel.

For the experiment on the laboratory testbed, the frequency response of the system was first measured over a 20-m air channel. The −3-dB bandwidth of the system 600 and the white-light laser-based VLC system 700 was increased from 290 kHz [1] to 348 kHz by means of hardware pre-equalization, as shown in FIG. 8. Next, the inventors studied the maximum data rate that could be achieved over a 20-m air channel while the PGA had its maximum gain (74 dB). The bit error ratio (BER) versus the data rate is illustrated in FIG. 9, where the insets are the constellation maps of the 4-QAM OFDM signals at data rates of 1 Mbit/s and 1.6 Mbit/s, respectively. Note that symbols sent over different periods were recorded and the average BER was calculated to improve the reliability in the experiment. Therefore, different shades in the constellation maps represent symbols sent over different periods. It shows that the achievable maximum data rate was 1.6 Mbit/s with a BER of $1.814 \times 10^{-3}$, which is below the forward error correction (FEC) limit of $3.8 \times 10^{-3}$.

Figure 10A:
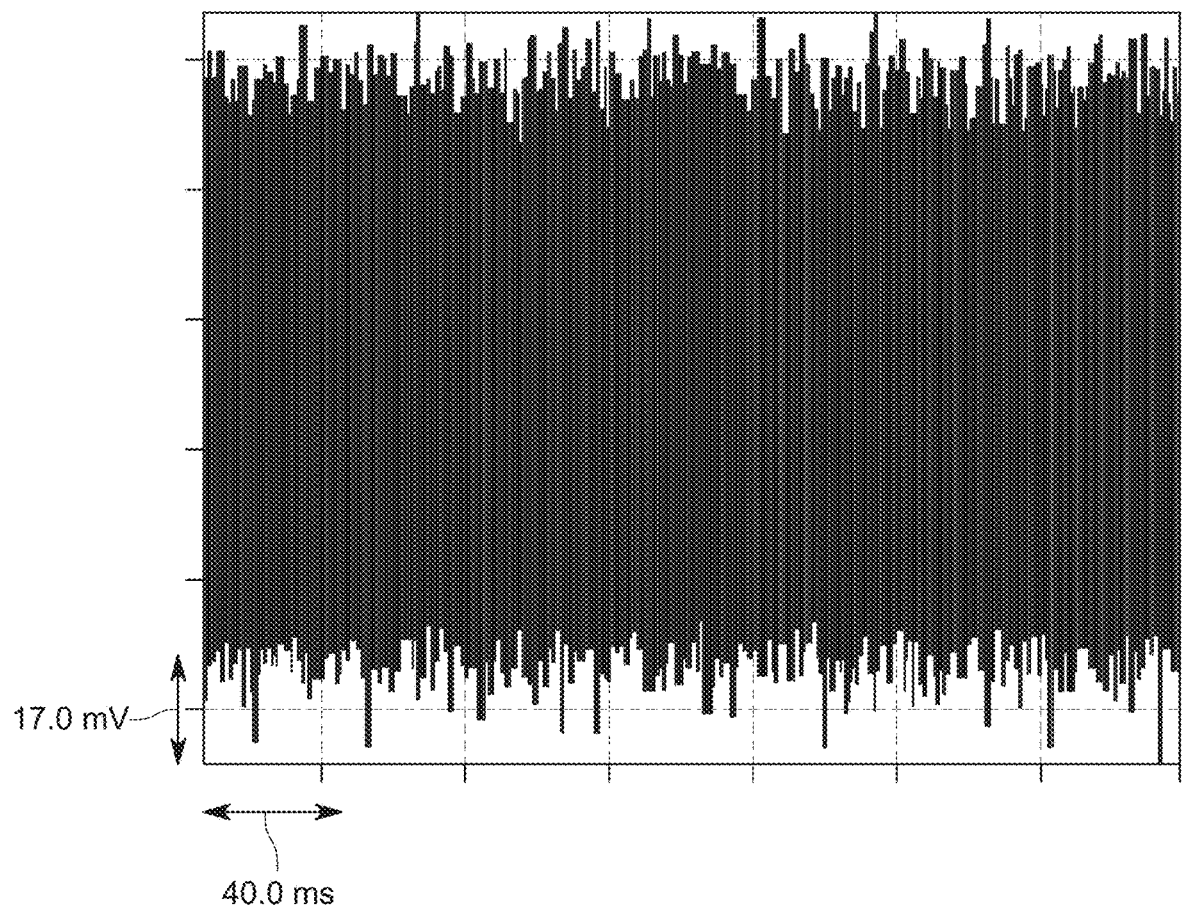
FIGS. 10A, 10B, and 10C show the waveform, spectrum, and constellation map of the 1.2 Mbit/s OFDM signals at 30 m.
Figure 10B:
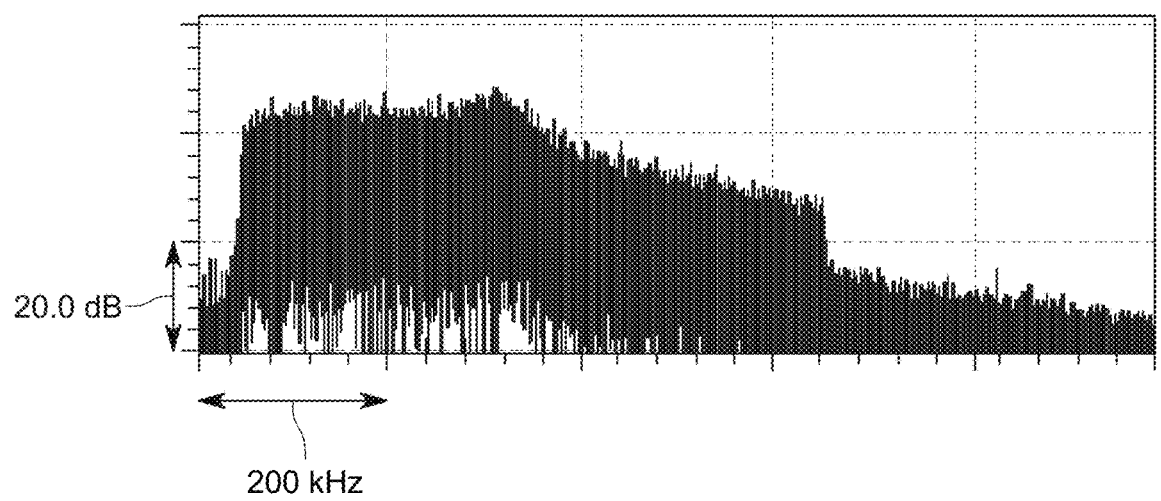
Figure 10C:
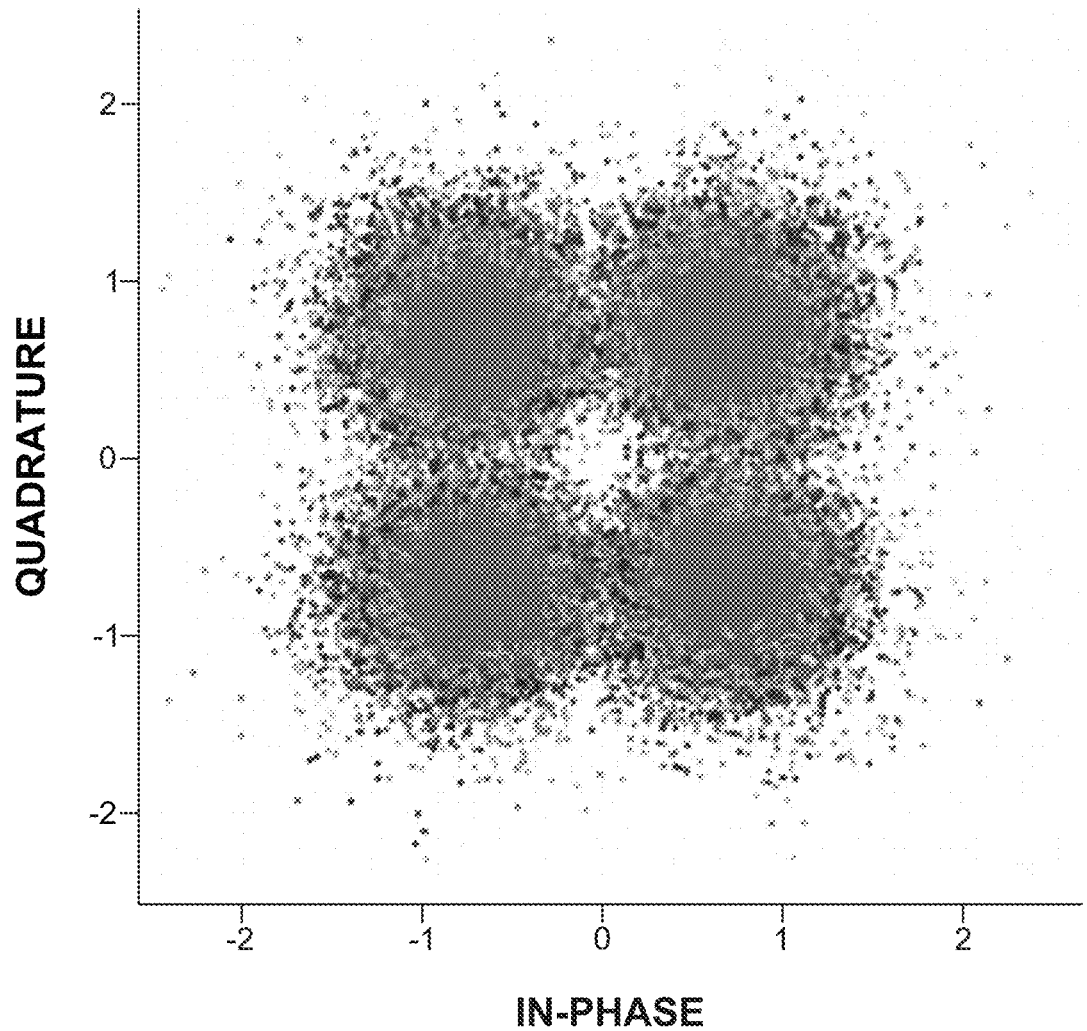

The inventors further investigated the maximum data rate that could be supported by the maximum gain of the PGA (74 dB) at a longer distance of 30 m. The BERs of the 1 Mbit/s, 1.2 Mbit/s, and 1.4 Mbit/s OFDM signals were $2.257 \times 10^{-3}$, $2.131 \times 10^{-3}$, and $6.450 \times 10^{-3}$, respectively. Thus, the maximum data rate at 30 m was 1.2 Mbit/s. The corresponding waveform, spectrum, and constellation map are presented in FIGS. 10A, 10B, and 10C, respectively. From the waveform shown in FIG. 10A, it can be seen that the mean peak-to-peak amplitude of the 1.2 Mbit/s OFDM signals amplified by the PGA at the receiver side was up to 160.9 mV over the 30-m air channel, which provided a relatively high SNR. The spectrum shown in FIG. 10B also demonstrated that the SNR was high enough to support 600-kHz (i.e., 1.2 Mbit/s) signal transmission.

Figure 11:
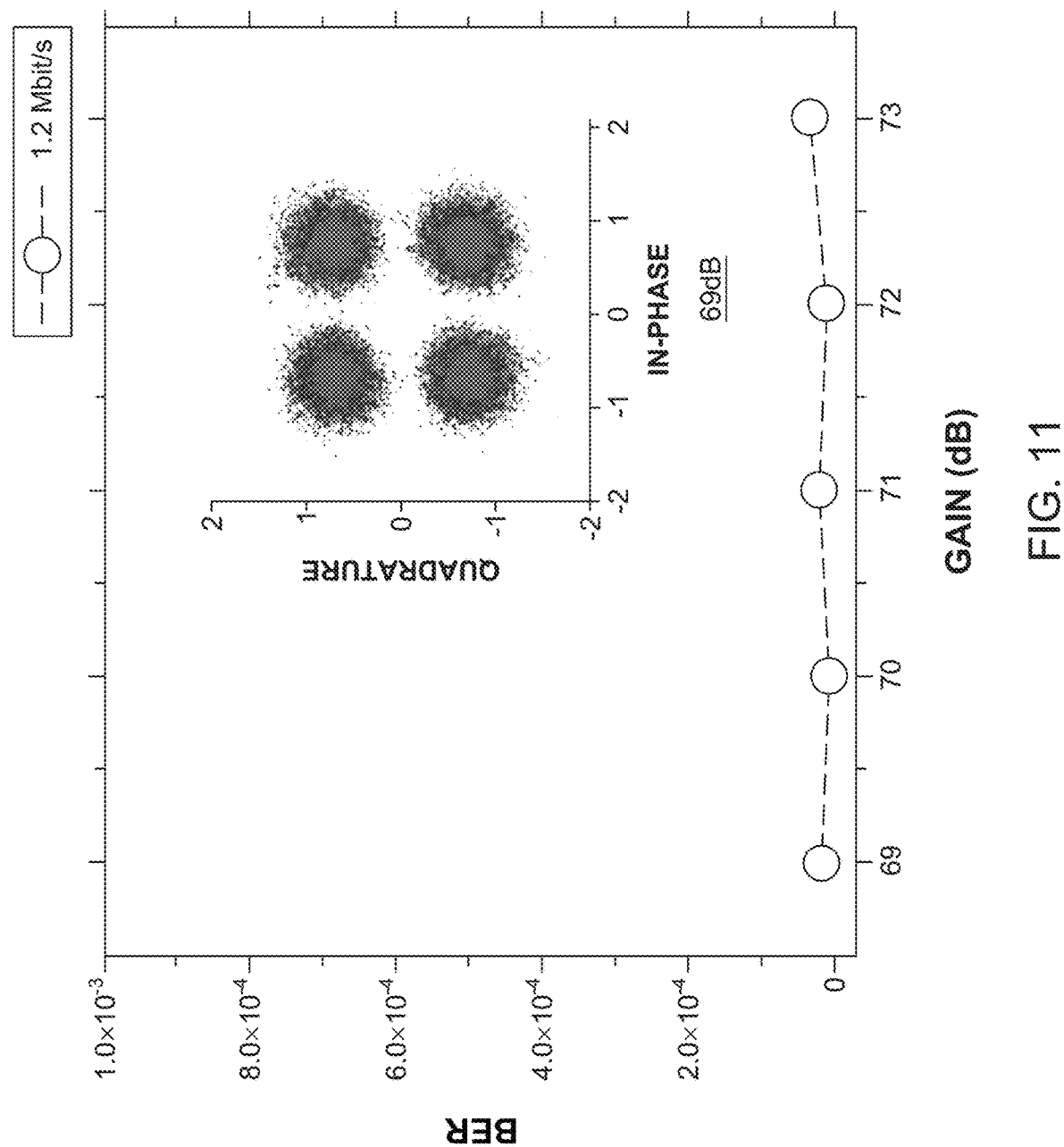
FIG. 11 shows the bit error ratio of the 1.2 Mbit/s 4-QAM OFDM signal as the gain of the amplifier is decreased.

Considering that the gain in the PGA decreased with the consumption of the battery energy in the receiving circuit, the inventors studied the effect of the PGA gain on the communication performance. The gain in the PGA at different battery levels was shown on the display screen (not shown), where $V_{sun}$ and $I_{sun}$ represent the output voltage and the current of the monocrystalline Si solar panel, respectively. Thus, the product of $V_{sun}$ and $I_{sun}$ is the power harvested from sunlight. $V_b$ and $I_b$ represent the total consumed voltage and current of the two batteries, respectively. Power represents the power consumed by system 600, which is the product of $V_b$ and $I_b$. Gain refers to the gain made by the PGA. The remaining capacity of the two batteries is also shown on the display screen 151. It is noted that the gain of the PGA gradually decreased from 73 dB to 69 dB with the consumption of electricity. As illustrated in FIG. 11, when the gain of the PGA decreased from 73 dB to 69 dB, the BERs of the 1.2 Mbit/s 4-QAM OFDM signal fluctuated within a small range (on the order of $10^{-4}$), but were all below the FEC limit. The inset is a constellation map of the 1.2 Mbit/s 4-QAM OFDM signal when the gain of the PGA was 69 dB, which converged well. This means that even though the gain of the PGA decreased to 69 dB as the battery level dropped, it was still high enough to provide a high SNR and, thus, support 1.2 Mbit/s data transmission over 20 m.

Figure 12:
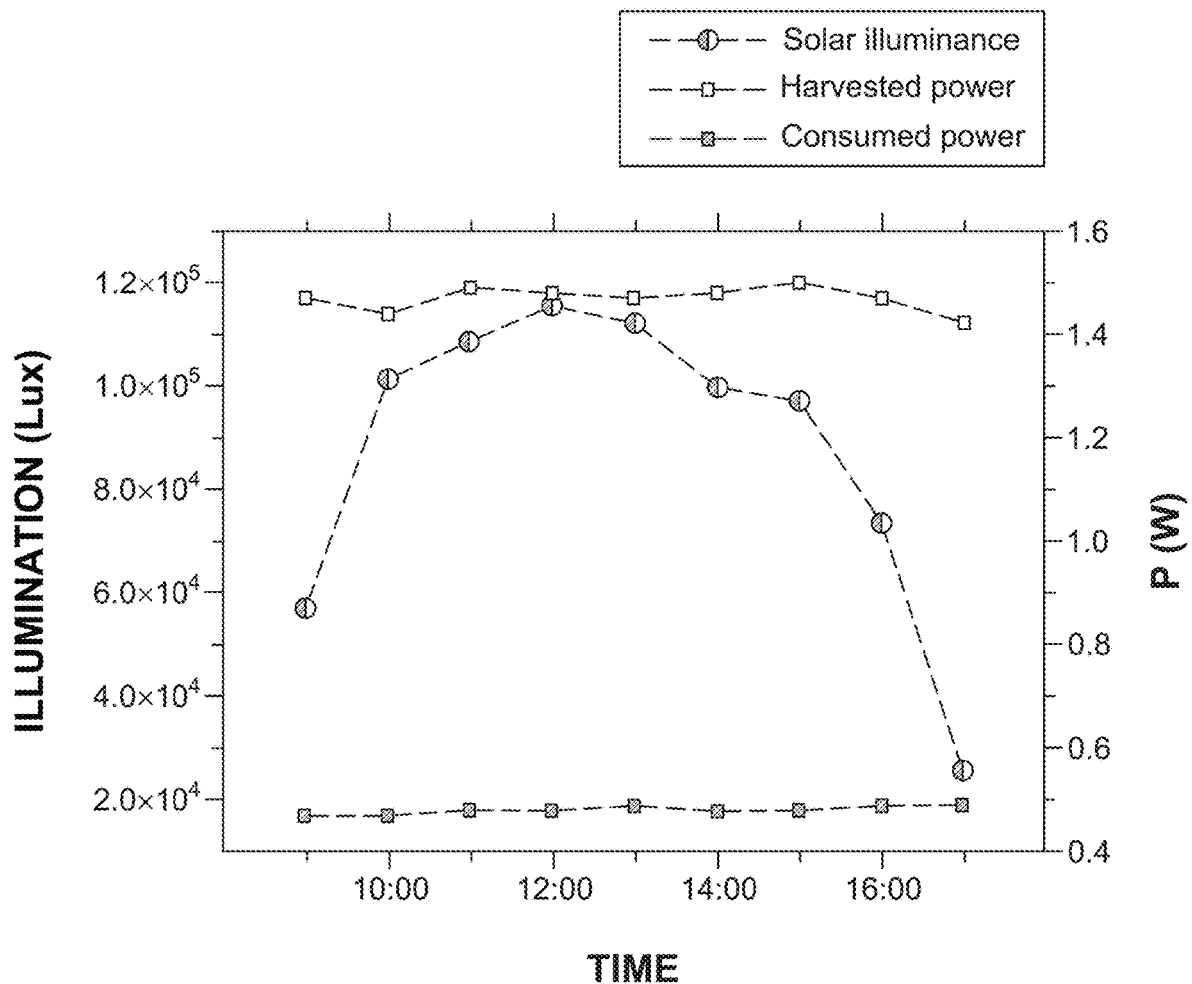
FIG. 12 shows the measured solar illuminance, power harvested by the harvesting solar cells, and the power consumed by the energy-autonomous optical wireless communication receiver.

In the field trial, the inventors measured first the solar illuminance, the power harvested by the monocrystalline Si solar panel 110, and the power consumed by the receiver circuit at different times, as shown in FIG. 12. The solar illuminance increased from 9:00 to 12:00 am and decreased from 12:00 to 17:00 pm. Both the harvested and the consumed power fluctuated in a narrow range at different times, but the overall power harvested was always greater than the power consumed. This indicates that the receiver 600 was energy-autonomous. The extra harvested energy was stored in the battery for backup. In one application, the harvested power can be further increased by using an autonomous sun-tracking system, and the consumed power can be further decreased by using wake-up strategies, where this is beneficial for shortening the charging time of the battery.

Figure 13:
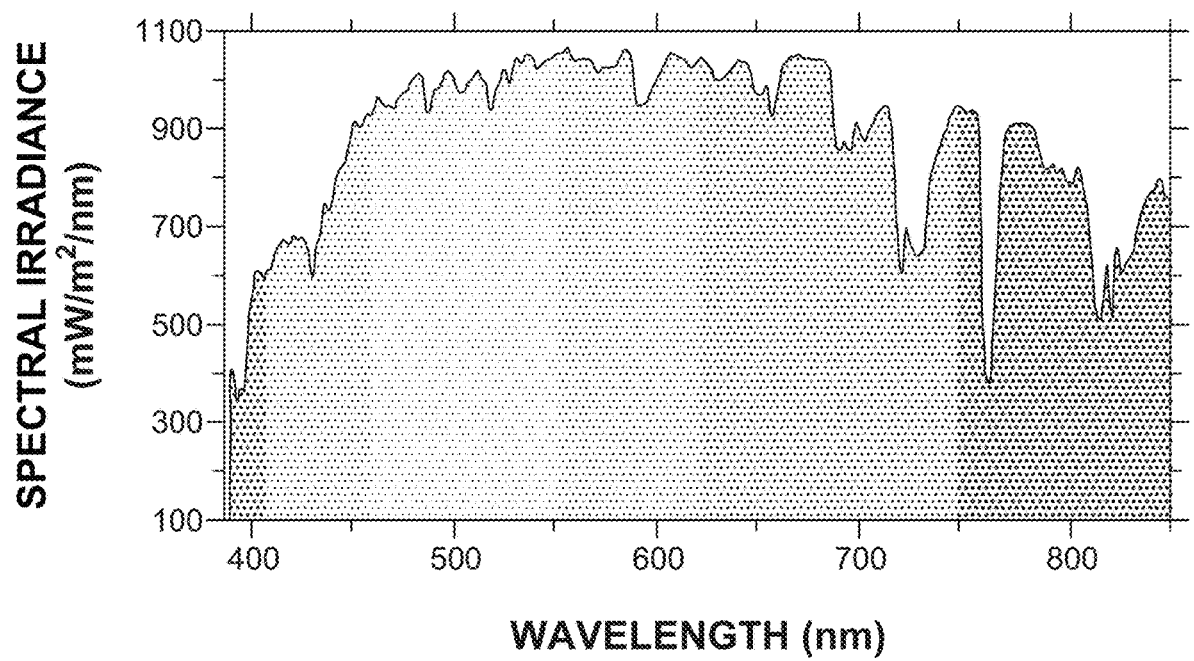
FIG. 13 shows the solar spectrum measured at the harvesting solar cells.
Figure 14:
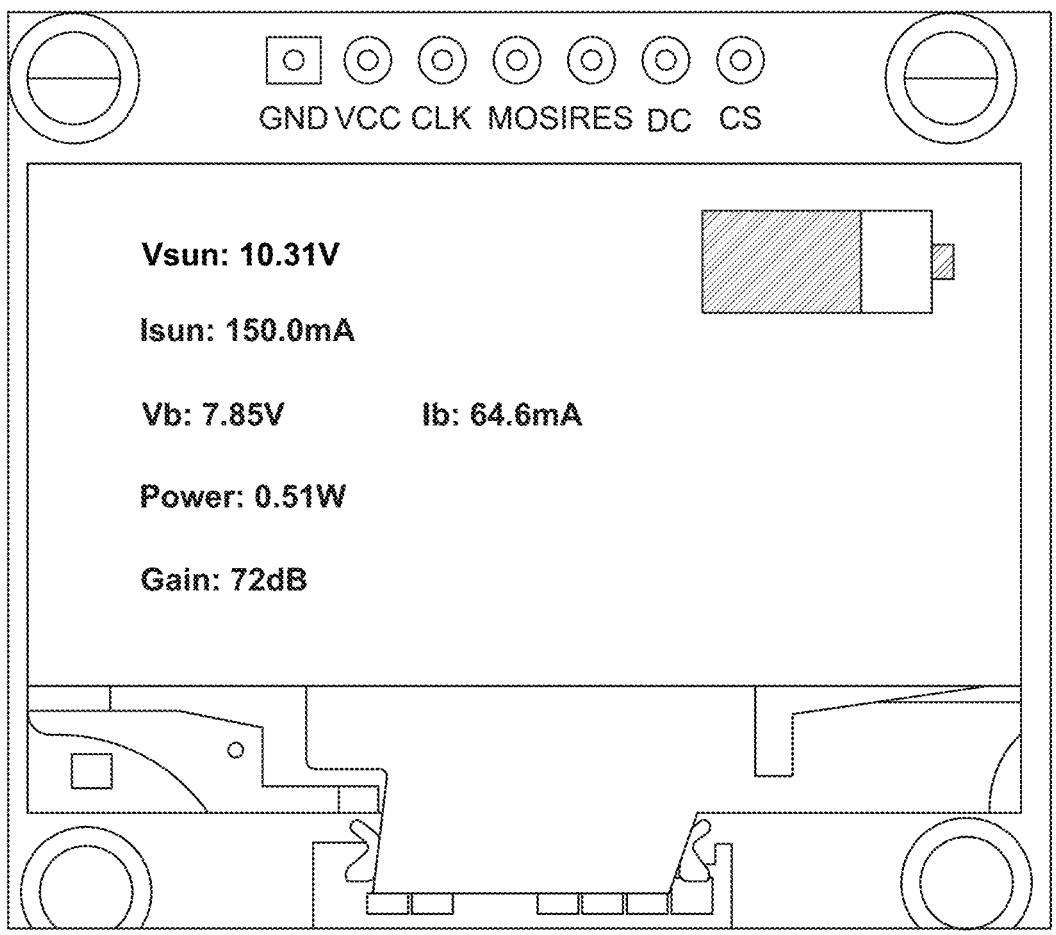
FIG. 14 shows a screen of the energy-autonomous optical wireless communication receiver that displays various parameters.
Figure 15:
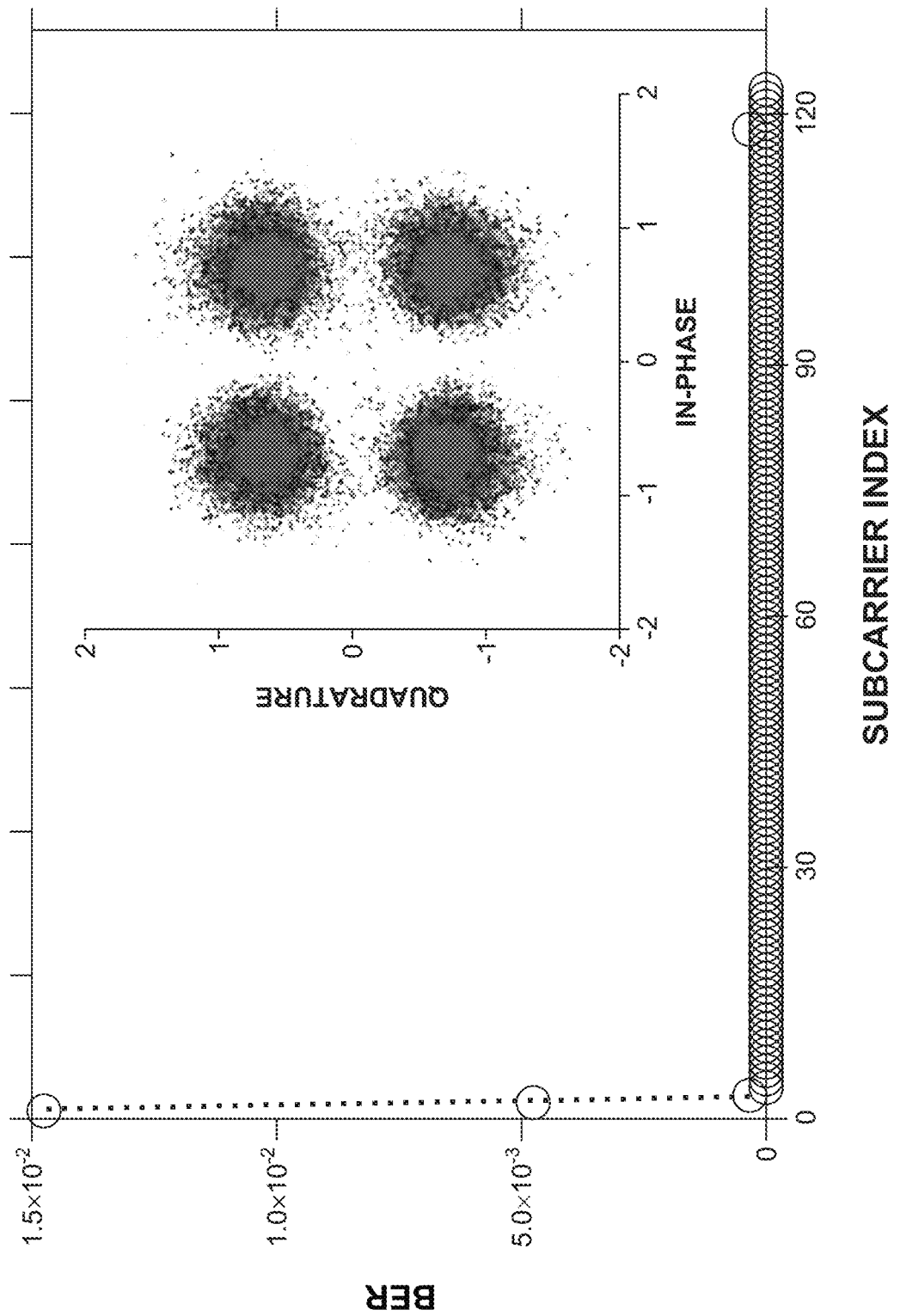
FIG. 15 shows the bit error ratios of the received 1.2 Mbit/s OFDM signals for different subcarriers after transmission through a 15 m air channel.

Next, the inventors demonstrated the superiority of the white-light laser 710 and receiver 600 in implementing a long-distance VLC system under strong background sunlight. FIG. 13 illustrates the solar spectrum measured during the field trial. The illuminance of the sunlight was measured at 75080.28 lx. In bright sunlight, the recorded parameters of the system 600 for simultaneous energy harvesting and VLC are illustrated in FIG. 14. On the display screen, $V_{sun}$ and $I_{sun}$ were 10.31 V and 150 mA, respectively. Thus, the power harvested from sunlight was 1.5465 W. $V_b$ and $I_b$ were 7.85 V and 64.6 mA, respectively. Thus, the power consumed by the system 600 was 0.51 W. Under the given circumstances, the gain was 72 dB, and 1.2 Mbit/s 4-QAM OFDM signals were obtained after transmitting through a 15-m air channel. FIG. 15 shows the BERs of the received 1.2 Mbit/s OFDM signals for different subcarriers. Higher BERs in the low-frequency regions were attributed to the strong optical background noise. However, the total BER was $1.624 \times 10^{-4}$, which was below the FEC limit. The corresponding constellation map is shown in the inset of FIG. 15, and converges well. This indicates that the receiver 600 has good performance in low-intensity optical signal detection and resistance to background noise over long-distance VLC under strong sunlight.

The inventors further investigated the communication performance of the receiver 600 under water. Note that the transmitter and the receiver were not aligned well due to the uneven ground. Moreover, as the field trial underwater was primarily designed to test communication performance, the monocrystalline Si solar panel used for energy harvesting was not connected to system 600. However, the system 600 can be deployed on the surface of water or in shallow water, where sunlight can reach it, to implement the simultaneous energy harvesting and VLC. It can also be installed on autonomous underwater vehicles, which can hover over the surface of water or in shallow water to recharge after completing missions in deep water. Thus, it will play an important role in future self-powered Internet of Underwater Things to significantly alleviate underwater energy-shortage issues.

Figure 16:
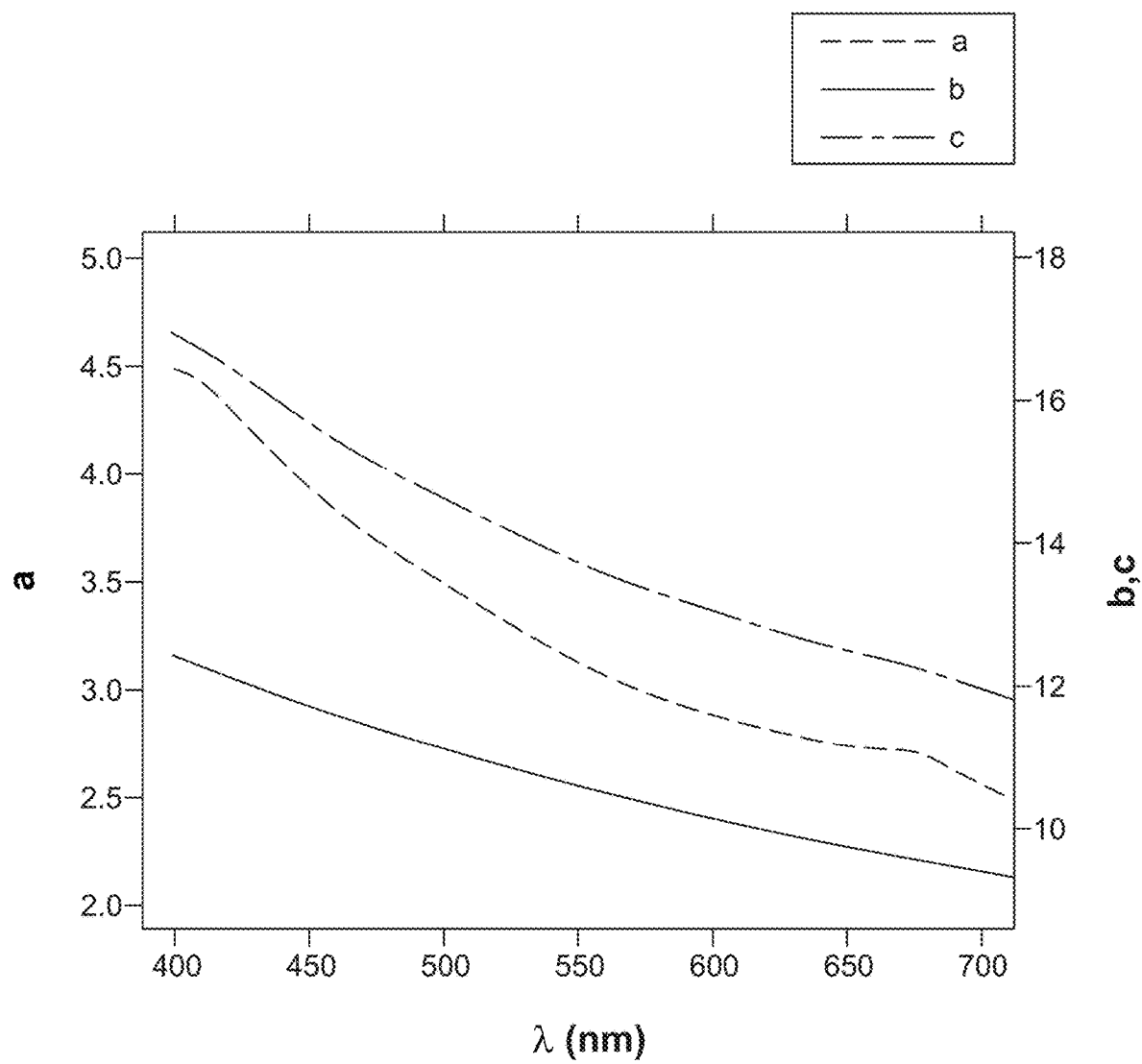
FIG. 16 shows the absorption, scattering and attenuation coefficients of the water in which the energy self-autonomous optical wireless communication receiver is placed and tested.
Figure 17:
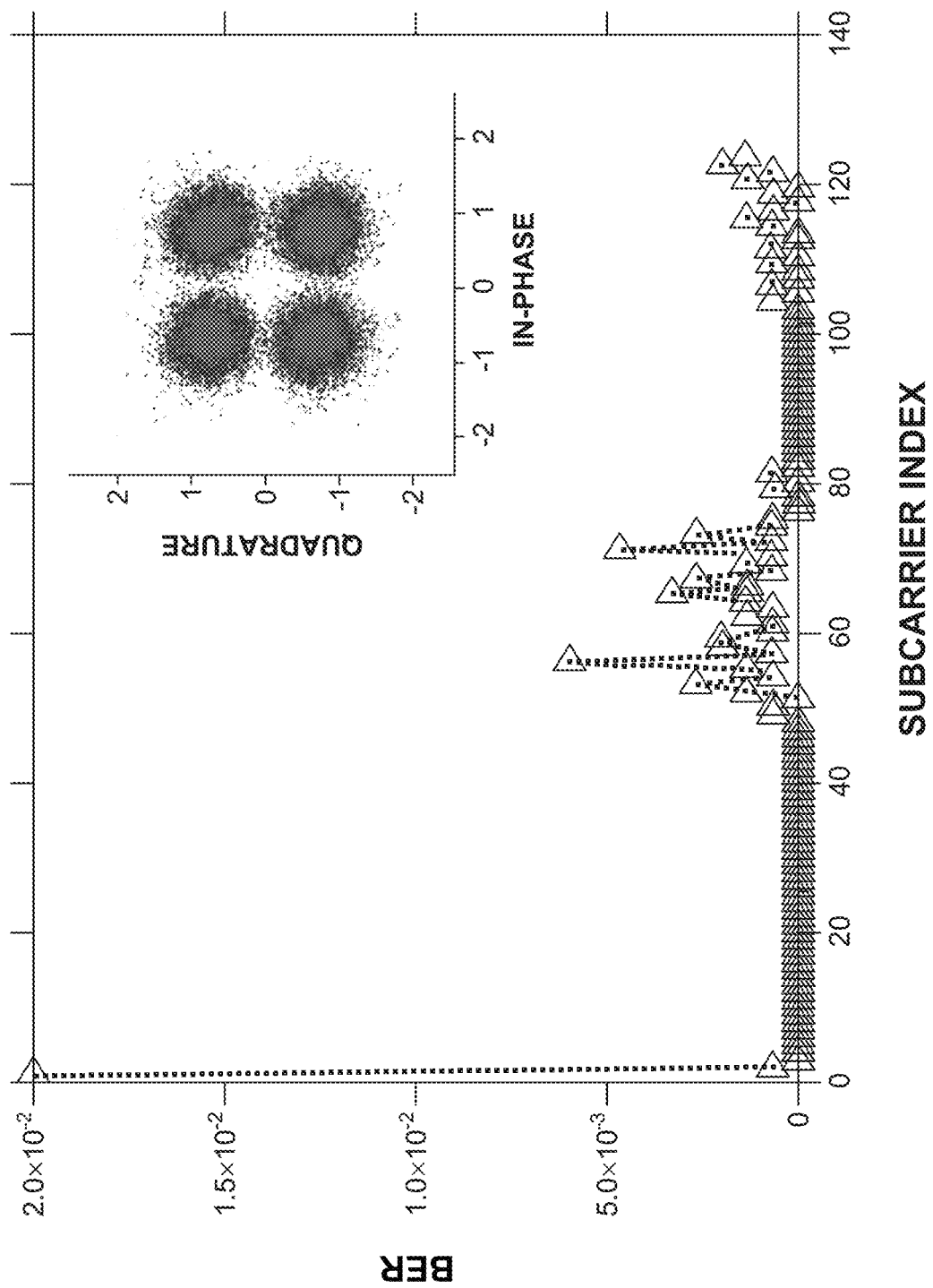
FIG. 17 shows the bit error ratios of the received 1.2 Mbit/s OFDM signals for different subcarriers after transmission through a 2 m turbid water channel.

FIG. 16 shows the absorption a, scattering b, and attenuation c coefficients of the water, measured by an ac-s Spectral Absorption and Attenuation Sensor at different wavelengths, A. According to these values, the water type at the harbor was optically complex waters like coastal area where it is dominated by inorganic suspended particles such as sediments. A variety of suspended particles were suspended between the transmitter and the receiver. In these circumstances, a 2-m transmission distance was still achieved at a data rate of 1.2 Mbit/s without strict link alignment. FIG. 17 shows the BERs of the received 1.2 Mbit/s OFDM signals for all subcarriers. Some random noise is evident in the spectrum. However, the mean BER was $6.125 \times 10^{-4}$, which was below the FEC limit. The corresponding constellation map is shown in the inset of FIG. 17, which converged well. This indicates that the receiver 600 having the large detection area, supporting low-intensity optical signal detection, and resistance to background noise has good robustness in the turbid water. Moreover, given these advantages, the system 600 can be used in future underwater mobile sensor networks to relieve the strict requirements for pointing, acquisition and tracking.

The hybrid-solar-cell receiver 100 or 600, which includes at least two kinds of solar cells for simultaneous efficient energy harvesting and low-intensity optical signal detection, has been demonstrated. The results obtained on the laboratory testbed (on shore) and various field trials (on shore and offshore) are listed in Table 1 in FIG. 18. Using hardware pre-equalization technology, the −3-dB bandwidth of the receiver 600 was improved from 290 kHz to 340 kHz and the achievable data rate at a distance of 20 m was improved from 1 Mbit/s to 1.6 Mbit/s by using OFDM on the laboratory testbed. Moreover, a 30-m long-distance illumination and VLC were implemented at a data rate of 1.2 Mbit/s due to the high absorption efficient of the thin-film a-Si solar cell. On the outdoor solar cell testbed, the system 600 delivered good performance in terms of resistance to background noise, which was attributed to the PGA and filter design in the hardware, gap design in OFDM, and selection of low-noise components. Under bright sunlight, energy autonomy was realized and a 15-m transmission distance was achieved at a data rate of 1.2 Mbit/s. In a more challenging field trial conducted underwater (in a local harbor), 1.2 Mbit/s OFDM signals were obtained over a 2-m transmission distance without strict link alignment, which demonstrated the good robustness of the receiver 600 with a large detection area. Given the above, energy-autonomous solar cell receivers with the advantages of efficient energy harvesting, low-intensity optical signal detection, and resistance to background noise have broad application to IoT and underwater mobile sensor networks.

Figure 19:
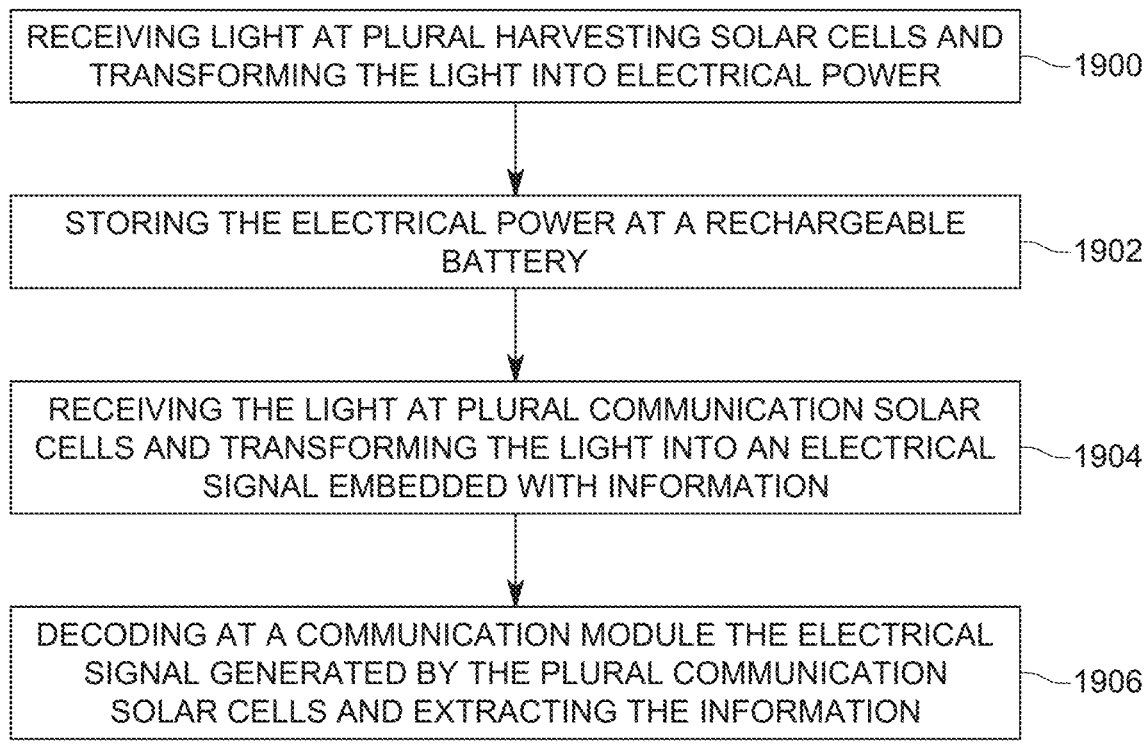
FIG. 19 is a flow chart of a method for simultaneously harvesting energy and transmitting data with an energy-autonomous optical wireless communication receiver.

A method for simultaneously harvesting energy and communicating data is now discussed with regard to FIG. 19. The method includes a step 1900 of receiving light at plural harvesting solar cells and transforming the light into electrical power, a step 1902 of storing the electrical power at a rechargeable battery, a step 1904 of receiving the light at plural communication solar cells and transforming the light into an electrical signal embedded with information, and a step 1906 of decoding at a communication module the electrical signal generated by the plural communication solar cells and extracting the information. The plural harvesting solar cells, the rechargeable battery, the plural communication solar cells, and the communication module are part of a single optical wireless communication receiver, and the steps of storing and decoding are taking place at a same time.

The method may further include a step of changing a harvesting-first state of a first switch, which electrically connects the plural harvesting solar cells to the rechargeable battery, to a communication-second state, which electrically connects the plural harvesting solar cells to the communication module, and/or a step of changing a communication-first state of a second switch, which electrically connects the plural communication solar cells to the communication module, to a harvesting-second state, which electrically connects the communication solar cells to the rechargeable battery. The method may further include a step of measuring with a microprocessor a speed of data in the communication module and changing the first switch from the harvesting-first state to the communication-second state when the speed is below a given speed threshold, and/or a step of measuring a power level of the rechargeable battery and changing the second switch from the communication-first state to the harvesting-second state when the power level is below a power threshold. In one application, the plural harvesting solar cells are interleaved with the plural communication solar cells along two mutually perpendicular axes. The plural harvesting solar cells are most sensitive to a first wavelength and the plural communication solar cells are most sensitive to a second wavelength, which is different from the first wavelength.

The disclosed embodiments provide an energy-autonomous optical wireless communication system that uses a switchable hybrid photoreceiver. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] M. Kong, J. Lin, C. H. Kang, C. Shen, Y. Guo, X. Sun, M. Sait, Y. Weng, H. Zhang, T. K. Ng, and B. S. Ooi, Toward self-powered and reliable visible light communication using amorphous silicon thin-film solar cells, Optics Express, vol. 27, pp. 34542-34551, 2019.

[2] J. Fakidis, S. Videv, H. Helmers, and H. Haas, 0.5-Gb/s OFDM-based laser data and power transfer using a GaAs photovoltaic cell, IEEE Photonics Technology Letters, vol. 30, no. 9, pp. 841-844, 2018.

[3] M. Kong, B. Sun, R. Sarwar, J. Shen, Y. Chen, F. Qu, J. Han, J. Chen, H. Qin, and J. Xu, Underwater wireless optical communication using a lens-free solar panel receiver, Optics Communications, vol. 426, pp. 94-98, 2018.

[4] H. Y. Wang, J. T. Wu, C. W. Chow, Y. Liu, C. H. Yeh, X. L. Liao, K. H. Lin, W. L. Wu, and Y. Y. Chen, Using pre-distorted PAM-4 signal and parallel resistance circuit to enhance the passive solar cell based visible light communication, Optics Communications, vol. 407, pp. 245-249, 2018.

[5] X. Chen, C. Min, and J. Guo, Visible light communication system using silicon photocell for energy gathering and data receiving, International Journal of Optics, vol. 2017, pp. 1-5, 2017.

[6] W. H. Shin, S. H. Yang, D. H. Kwon, and S. K. Han, Self-reverse-biased solar panel optical receiver for simultaneous visible light communication and energy harvesting, Optics Express, vol. 24, no. 22, pp. A1300-A1305, 2016.

[7] S. M. Kim, J. S. Won, and S. H. Nahm, Simultaneous reception of solar power and visible light communication using a solar cell, Optical Engineering, vol. 53, no. 4, pp. 046103, 2014.

[8] J. I. de Oliveira Filho, A. Trichili, B. S. Ooi, M. S. Alouini, and K. N. Salama, Toward self-powered Internet of Underwater Things devices, IEEE Communications Magazine, vol. 58, no. 1, pp. 68-73, 2020.

What is claimed is:

1. An optical wireless communication receiver comprising:
    one or more harvesting solar cells configured to transform light into electrical power;
    one or more communication solar cells configured to transform light into an electrical signal embedding information;
    a rechargeable battery configured to store the electrical power generated by the one or more harvesting solar cells;
    a communication module configured to decode the electrical signal generated by the one or more communication solar cells and extract the information;

a first switch configured to connect the one or more harvesting solar cells to the rechargeable battery for a harvesting-first state, and to the communication module for a communication-second state;

a second switch configured to connect the one or more communication solar cells to the communication module for a communication-first state, and to the rechargeable battery for a harvesting-second state; and a microprocessor configured to control the first and second switches based exclusively on (1) data stored in the electrical signal embedding information, or (2) a measurement of a data speed through the communication module.

2. The receiver of claim 1, wherein the one or more harvesting solar cells are interleaved with the one or more communication solar cells along a first axis.

3. The receiver of claim 1, wherein there is no other power source in the receiver.

4. The receiver of claim 1, wherein an area of a solar cell of the one or more harvesting solar cells is larger than an area of a solar cell of the one or more communication solar cells.

5. The receiver of claim 1, wherein the microprocessor is configured to instruct the first switch to change from the harvesting-first state to the communication-second state so that an electrical signal generated by the one or more harvesting solar cells is sent to the communication module as the harvesting solar cells act as communication solar cells.

6. The receiver of claim 5, wherein the microprocessor instructs the first switch to change from the harvesting-first state to the communication-second state when a data communication speed is above a given threshold.

7. The receiver of claim 1, wherein the microprocessor is configured to instruct the second switch to change from the communication-first state to the harvesting-second state so that the electrical signal generated by the one or more communication solar cells are added as electrical power to the rechargeable battery.

8. The receiver of claim 7, wherein the microprocessor instructs the second switch to change from the communication-first state to the harvesting-second state when a power level in the rechargeable battery is below a given threshold.

9. The receiver of claim 1, wherein the one or more harvesting solar cells are made of a different material from the one or more communication solar cells.

10. The receiver of claim 1, wherein the one or more harvesting solar cells are most sensitive to a first wavelength and the one or more communication solar cells are most sensitive to a second wavelength, which is different from the first wavelength.

11. A method for harvesting energy and communicating data, the method comprising:
receiving light at one or more harvesting solar cells and transforming the light into electrical power;
storing the electrical power at a rechargeable battery;
receiving the light at one or more communication solar cells and transforming the light into an electrical signal embedded with information; and
decoding at a communication module the electrical signal generated by the one or more communication solar cells and extracting the information,
wherein the one or more harvesting solar cells, the rechargeable battery, the one or more communication solar cells, and the communication module are part of a single optical wireless communication receiver, and
wherein the steps of storing and decoding are taking place at a same time.

12. The method of claim 11, further comprising:
changing a harvesting-first state of a first switch, which electrically connects the one or more harvesting solar cells to the rechargeable battery, to a communication-second state, so that the first switch electrically connects the one or more harvesting solar cells to the communication module as the harvesting solar cells act as communication solar cells.

13. The method of claim 12, further comprising:
changing a communication-first state of a second switch, which electrically connects the one or more communication solar cells to the communication module, to a harvesting-second state, so that the second switch electrically connects the communication solar cells to the rechargeable battery.

14. The method of claim 13, further comprising:
measuring with a microprocessor a speed of data and changing the first switch from the harvesting-first state to the communication-second state when the speed is above a given speed threshold.

15. The method of claim 13, further comprising:
measuring a power level of the rechargeable battery and changing the second switch from the communication-first state to the harvesting-second state when the power level is below a power threshold.

16. The method of claim 11, wherein the one or more harvesting solar cells are interleaved with the one or more communication solar cells along two mutually perpendicular axes.

17. The method of claim 11, wherein the one or more harvesting solar cells are most sensitive to a first wavelength and the one or more communication solar cells are most sensitive to a second wavelength, which is different from the first wavelength.

18. An optical communication and energy harvesting system comprising:
a transmitter configured to generate a light beam that encodes data; and
an optical wireless communication receiver configured to simultaneously use the light beam for generating electrical power and to extract the encoded data,
wherein the optical wireless communication receiver includes,
one or more harvesting solar cells configured to transform the light beam into the electrical power, and
one or more communication solar cells configured to transform the light beam into an electrical signal embedded with the data.

19. The system of claim 18, wherein the optical wireless communication receiver further comprises:
a rechargeable battery configured to store the electrical power generated by the one or more harvesting solar cells;
a communication module configured to decode the electrical signal generated by the one or more communication solar cells and extract the data;
a first switch configured to connect the one or more harvesting solar cells to the rechargeable battery for a harvesting-first state, and to the communication module for a communication-second state;
a second switch configured to connect the one or more communication solar cells to the communication module for a communication-first state, and to the rechargeable battery for a harvesting-second state; and a microprocessor configured to control the first and second switches.

20. The system of claim 19, wherein the one or more harvesting solar cells are interleaved with the one or more communication solar cells along two mutually perpendicular axes.

\* \* \* \* \*